US012334293B2

(12) United States Patent
Kondo et al.

(10) Patent No.: US 12,334,293 B2
(45) Date of Patent: Jun. 17, 2025

(54) ELECTRIC CIRCUIT CUT-OFF DEVICE

(71) Applicant: Pacific Engineering Corporation, Gifu (JP)

(72) Inventors: Yusuke Kondo, Gifu (JP); Akihiko Shimizu, Gifu (JP)

(73) Assignee: Pacific Engineering Corporation, Gifu (JP)

( * ) Notice: Subject to any disclaimer, the term of this patent is extended or adjusted under 35 U.S.C. 154(b) by 124 days.

(21) Appl. No.: 18/032,532

(22) PCT Filed: Oct. 22, 2021

(86) PCT No.: PCT/JP2021/039033
§ 371 (c)(1),
(2) Date: Apr. 18, 2023

(87) PCT Pub. No.: WO2022/130781
PCT Pub. Date: Jun. 23, 2022

(65) Prior Publication Data

US 2023/0386777 A1 Nov. 30, 2023

(30) Foreign Application Priority Data

Dec. 16, 2020 (JP) ................................ 2020-208249

(51) Int. Cl.
*H01H 33/53* (2006.01)
*H01H 85/38* (2006.01)
(Continued)

(52) U.S. Cl.
CPC ............ *H01H 89/00* (2013.01); *H01H 33/53* (2013.01); *H01H 85/42* (2013.01); *H01H 2085/388* (2013.01); *H01H 2231/026* (2013.01)

(58) Field of Classification Search
CPC ........ H01H 33/53; H01H 33/59; H01H 39/00; H01H 39/006; H01H 85/42; H01H 85/10;
(Continued)

(56) References Cited

U.S. PATENT DOCUMENTS 4,479,105 A 10/1984 Banes
7,222,561 B2 * 5/2007 Brede .................. H01H 39/006 60/632
(Continued)

FOREIGN PATENT DOCUMENTS

FR 3051281 A1 * 11/2017 ............. H01H 39/00
JP 45-28139 9/1970
(Continued)

OTHER PUBLICATIONS

Translation of Fr 3051281 (Original document published on Nov. 17, 2017) (Year: 2017).*
(Continued)

*Primary Examiner* — William A Bolton
(74) *Attorney, Agent, or Firm* — Lowe Graham Jones PLLC

(57) ABSTRACT

An electric circuit cut-off device including a housing, a to-be-cut part, a power source, and a moving body that moves between first and second end portions on opposite sides, a fuse including a fusing portion and an arc-extinguishing material, and a pair of electrode parts connected to terminals on both sides of the fuse. The moving body is configured to cut a piece located between base pieces on both sides of the to-be-cut part and a part of the to-be-cut part and the electrode part come into contact with each other in a state where base pieces on both sides of the to-be-cut part are energized via the cut piece, and the to-be-cut part and the fuse are connected to each other; and thereafter a
(Continued)

state in which the base pieces on both sides of the to-be-cut part are energized via the cut piece is cut off.

11 Claims, 29 Drawing Sheets

(51) Int. Cl.
*H01H 85/42* (2006.01)
*H01H 89/00* (2006.01)

(58) Field of Classification Search
CPC .... H01H 85/0241; H01H 85/18; H01H 85/02; H01H 2085/388; H01H 2231/026; H01H 9/54; H01H 9/102; H01H 9/106
USPC ............... 218/154, 95, 94; 200/50.07, 61.08, 200/150 R; 337/4, 6, 401; 361/58
See application file for complete search history.

(56) References Cited

U.S. PATENT DOCUMENTS

| | | | | |
|---|---|---|---|---|
| 7,745,745 | B2 * | 6/2010 | Kordel | F42B 3/006 200/61.08 |
| 10,211,014 | B2 * | 2/2019 | Kim | H01H 85/0241 |
| 10,832,882 | B2 * | 11/2020 | Yamada | H01H 39/00 |
| 2012/0234162 | A1 * | 9/2012 | Tirmizi | F42B 3/006 89/1.14 |
| 2013/0056344 | A1 * | 3/2013 | Borg | H01H 39/00 200/81 R |
| 2013/0220095 | A1 * | 8/2013 | Ukon | H01H 39/006 83/639.1 |
| 2014/0061161 | A1 * | 3/2014 | Nakamura | H01H 33/06 218/46 |
| 2016/0293362 | A1 * | 10/2016 | Fukuyama | H01H 39/006 |
| 2019/0108957 | A1 * | 4/2019 | Volkmann | H01H 39/006 |
| 2020/0035437 | A1 * | 1/2020 | Gaudinat | H01H 39/00 |

FOREIGN PATENT DOCUMENTS

| | | |
|---|---|---|
| JP | 59-169029 | 9/1984 |
| JP | 63165747 | 10/1988 |
| JP | 2019-212612 | 12/2019 |
| JP | 2020-161468 | 10/2020 |

OTHER PUBLICATIONS

International Search Report (+ English translation) and Written Opinion of the International Searching Authority dated Dec. 21, 2021, in International Patent Application No. PCT/JP2021/039033, 8 pages.

* cited by examiner

ELECTRIC CIRCUIT CUT-OFF DEVICE

PRIORITY CLAIM

This application is a U.S. national phase of International Patent Application No. PCT/JP2021/039033 filed Oct. 22, 2021, which claims the benefit of priority from Japan Patent Application No. 2020-208249 filed Dec. 16, 2020, the contents of which are incorporated herein by reference.

FIELD OF THE INVENTION

The invention of the present application relates to an electric circuit cut-off device that can be mainly used for an electric circuit of an automobile or the like.

BACKGROUND OF THE INVENTION

Conventionally, an electric circuit cut-off device has been used to protect an electric circuit mounted on an automobile or the like and various electric components connected to the electric circuit. Specifically, when an abnormality occurs in the electric circuit, the electric circuit cut-off device cuts a part of the electric circuit to physically cut off the electric circuit.

There are various types of the electric circuit cut-off device, and for example, the electric circuit cut-off device of Patent Literature 1 is an electric circuit cut-off device including a housing, a to-be-cut part that is disposed in the housing and constitutes a part of an electric circuit, a power source that is disposed on a first end portion side of the housing, and a moving body that moves in the housing between the first end portion and a second end portion on a side opposite to the first end portion, where the moving body is moved by the power source from the first end portion toward the second end portion, and a part of the moving body cuts the to-be-cut part to cut off the electric circuit.

Voltage and current applied to an electric circuit tend to increase due to recent improvement in performance of automobiles and the like, and it is required to extinguish, quickly and safely in a more effective manner, an arc generated immediately after the electric circuit is cut off by the electric circuit cut-off device. Here, in the electric circuit cut-off device of Patent Literature 1, in order to extinguish the arc quickly in a more effective manner, devisal such as enclosing an arc-extinguishing material around the to-be-cut part in the housing can be considered, but there is also a limit in increasing the amount of the arc-extinguishing material that can be enclosed around the to-be-cut part in the housing.

CITATIONS LIST

Patent Literature

Patent Literature 1: Japanese Laid-Open Patent Application No. 2019-212612

SUMMARY OF THE INVENTION

Technical Problems

Therefore, in view of the above problems, the invention of the present application provides an electric circuit cut-off device capable of extinguishing an arc generated immediately after the electric circuit is cut off quickly and safely in a more effective manner. SOLUTIONS TO PROBLEMS An electric circuit cut-off device of the invention of the present application includes a housing; a to-be-cut part that is disposed in the housing and constitutes a part of an electric circuit; a power source disposed on a first end portion side of the housing; and a moving body that moves in the housing between the first end portion and a second end portion on an opposite side of the first end portion; where a fuse including a fusing portion and an arc-extinguishing material, and a pair of electrode parts connected to terminals on both sides of the fuse are provided; the moving body is configured such that a part of the moving body cuts a cut piece located between base pieces on both sides of the to-be-cut part while moving from the first end portion toward the second end portion by the power source; when the moving body moves toward the second end portion, a part of the to-be-cut part and the electrode part come into contact with each other in a state where base pieces on both sides of the to-be-cut part are energized via the cut piece, and the to-be-cut part and the fuse are connected to each other; and thereafter, accompanying the movement of the moving body, a state in which the base pieces on both sides of the to-be-cut part are energized via the cut pieces is cut off.

According to the above feature, the current (fault current) flowing to the electric circuit when the electric circuit is cut off is guided to the fuse, and the arc generated by the guided current can be effectively and quickly extinguished in the fuse. Since the state in which the to-be-cut part and the fuse are connected is secured before the state in which the to-be-cut part is energized is cut off and an arc due to a fault current is generated, the arc due to the fault current can be reliably guided to the fuse and extinguished in the fuse. As a result, in the housing, it is possible to prevent the arc due to a fault current from generating and the electric circuit cut-off device from damaging, and the electric circuit can be safely cut off.

In the electric circuit cut-off device of the invention of the present application, the electrode part is provided in the moving body; a state in which the base pieces on both sides of the to-be-cut part are energized via the cut piece is a state in which the base piece and the cut piece are physically coupled and energized; and the energized state is cut off when a part of the moving body cuts the cut piece.

According to the above feature, the current (fault current) flowing to the electric circuit when the electric circuit is cut off is guided to the fuse, and the arc generated by the guided current can be effectively and quickly extinguished in the fuse, and the electric circuit can be safely cut off.

In the electric circuit cut-off device of the invention of the present application, a part of the moving body that cuts the to-be-cut part is the electrode part.

According to the above feature, the operation of cutting the cut piece after the fuse and the to-be-cut part are energized via the electrode part can be realized more easily and reliably.

In the electric circuit cut-off device of the invention of the present application, the electrode part is provided in the moving body; a state in which the base pieces on both sides of the to-be-cut part are energized via the cut piece is a state in which the base piece and the cut piece physically cut and separated from the base piece are energized by arc discharge; and the energized state is cut off by an insulator being interposed between the base piece and the cut piece with the movement of the moving body.

According to the above feature, the current (fault current) flowing to the electric circuit when the electric circuit is cut off is guided to the fuse, and the arc generated by the guided current can be effectively and quickly extinguished in the fuse, and the electric circuit can be safely cut off.

In the electric circuit cut-off device of the invention of the present application, the fuse is provided in the housing.

According to the above feature, the fuse is less likely to be affected by the impact due to the movement of the moving body, and the fuse is less likely to be damaged.

In the electric circuit cut-off device of the invention of the present application, the electrode part and the fuse are provided in the housing.

According to the above feature, the connectivity between the pair of electrode parts and the fuse is not affected by the movement of the moving body, and a stable and reliable connected state can be easily maintained. Therefore, the connection configuration of the pair of electrode parts and the fuse can be simplified without considering the movement of the moving body.

In the electric circuit cut-off device of the invention of the present application, a state in which the base pieces on both sides of the to-be-cut part are energized via the cut piece is a state in which the base piece and the cut piece are physically coupled and energized; in the energized state, a part of the moving body deforms a part of the to-be-cut part toward the electrode part, so that the electrode part and the part of the to-be-cut part are brought into contact with each other, and the to-be-cut part and the fuse are connected to each other; and the energized state is cut off when a part of the moving body cuts the cut piece.

According to the above feature, the current (fault current) flowing to the electric circuit when the electric circuit is cut off is guided to the fuse, and the arc generated by the guided current can be effectively and quickly extinguished in the fuse, and the electric circuit can be safely cut off.

In the electric circuit cut-off device of the invention of the present application, a state in which the base pieces on both sides of the to-be-cut part are energized via the cut piece is a state in which the base piece and the cut piece physically cut and separated from the base piece are energized by a conductor provided in the moving body; and in the energized state, the base piece of the to-be-cut part and the electrode part are connected via the conductor of the moving body, and the to-be-cut part and the fuse are connected.

According to the above feature, the current (fault current) flowing to the electric circuit when the electric circuit is cut off is guided to the fuse, and the arc generated by the guided current can be effectively and quickly extinguished in the fuse, and the electric circuit can be safely cut off.

Advantageous Effects of Invention

As described above, according to the electric circuit cut-off device of the invention of the present application, an arc generated immediately after the electric circuit is cut off can be quickly and safely extinguished in a more effective manner.

BRIEF DESCRIPTION OF THE DRAWINGS

Preferred and alternative examples of the present invention are described in detail below with reference to the following drawings.

REFERENCE SIGNS LIST

Figure 1A:
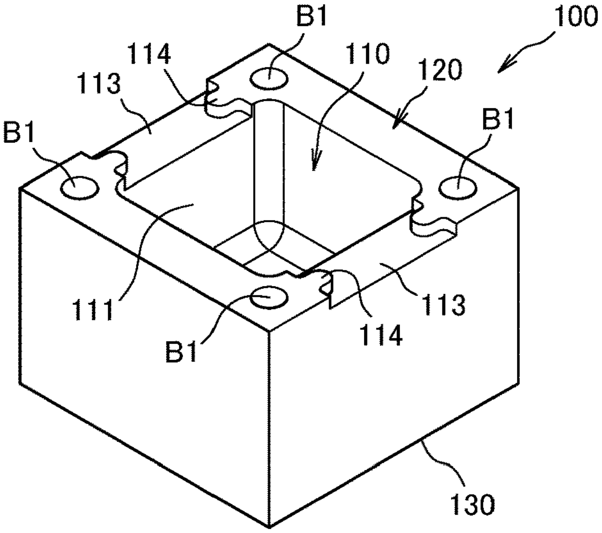
FIG. 1(*a*) is an overall perspective view of a lower housing constituting a housing of an electric circuit cut-off device according to a first embodiment of the invention of the present application, FIG. 1(*b*) is a plan view of the lower housing, and FIG. 1(*c*) is a cross-sectional view taken along line A-A.

300 housing
320 first end portion
330 second end portion
400 to-be-cut part
420 cut piece
430 base piece
500 moving body
600 electric circuit cut-off device
700 fuse
730 arc-extinguishing material
740 fusing portion
P power source

DETAILED DESCRIPTION OF THE PREFERRED EMBODIMENT

Hereinafter, each embodiment of the invention of the present application will be described with reference to the drawings. The shape, material, and the like of each member of an electric circuit cut-off device in the embodiment described below are merely examples, and are not limited thereto.

First Embodiment

Figure 1B:
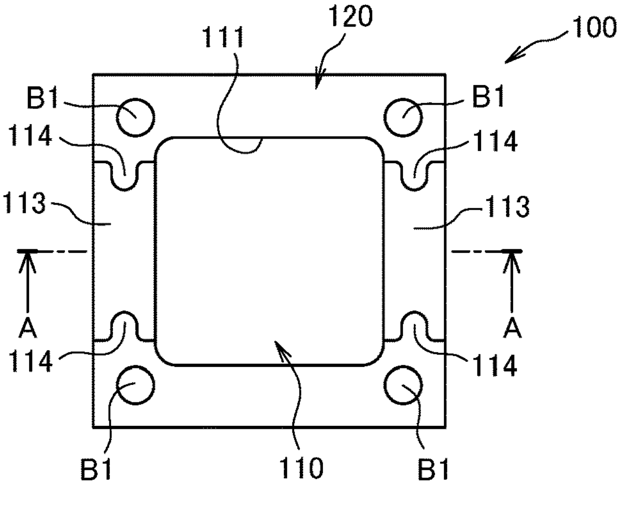
Figure 1C:
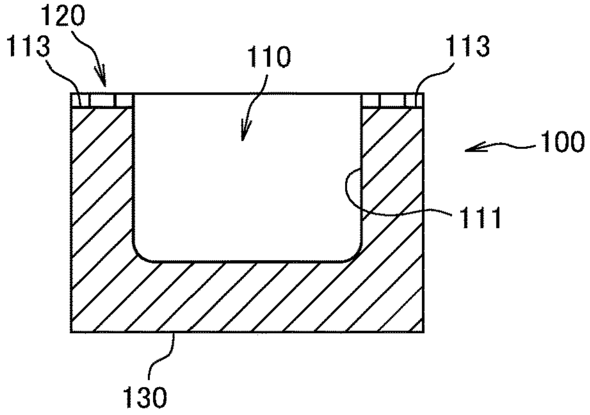

First, FIG. 1 shows a lower housing 100 constituting a housing 300 of an electric circuit cut-off device according to a first embodiment of the invention of the present application. FIG. 1(*a*) is an overall perspective view of the lower housing 100, FIG. 1(*b*) is a plan view of the lower housing 100, and FIG. 1(*c*) is a cross-sectional view taken along line A-A.

As shown in FIG. 1, the lower housing 100 is a substantially quadrangular prism body made of an insulator such as a synthetic resin, and interiorly includes a hollow lower accommodating portion 110. The lower accommodating portion 110 extends from an upper surface 120 toward a lower surface 130 of the lower housing 100, and is configured to accommodate a moving body 500 to be described later. Furthermore, an inner surface 111 of the lower accommodating portion 110 is a smooth surface so that the moving body 500 can slide inside in the up-down direction. In addition, a placement portion 113 recessed in accordance with the shape of a base piece 430 is provided on a part of the upper surface 120 so that the base piece 430 of the to-be-cut part 400 described later can be placed. The placement portion 113 is disposed so as to face both sides of the lower accommodating portion 110, and the placement portion 113 supports the linearly extending to-be-cut part 400 on both sides. Furthermore, the placement portion 113 is provided with a claw 114, and engages with a part of the base piece 430 of the placed to-be-cut part 400 to fix the to-be-cut part 400 so as not to shift. Moreover, coupling holes B1 are formed at four corners of the upper surface 120 of the lower housing 100, which coupling holes B1 are arranged so as to vertically coincide with coupling holes B2 of the upper housing 200 described later.

Figure 2A:
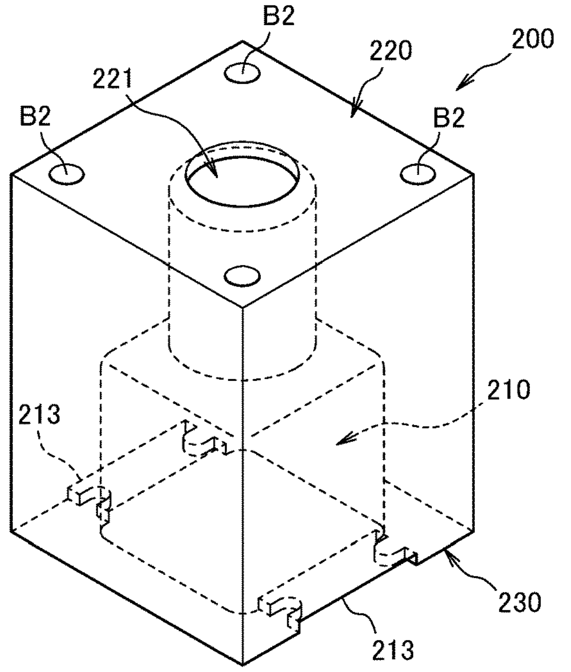
FIG. 2(*a*) is an overall perspective view of an upper housing constituting the housing of the electric circuit cut-off device according to the first embodiment of the invention of the present application, FIG. 2(*b*) is a plan view of the upper housing, and FIG. 2(*c*) is a cross-sectional view of the upper housing taken along line B-B.
Figure 2B:
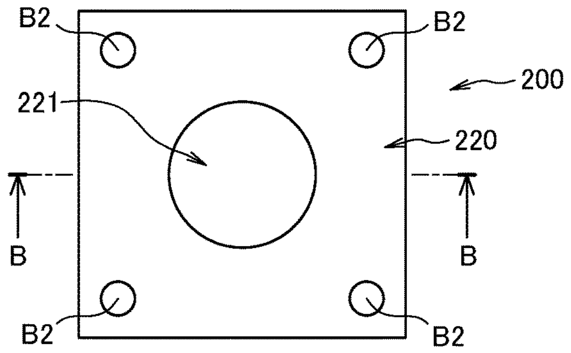
Figure 2C:
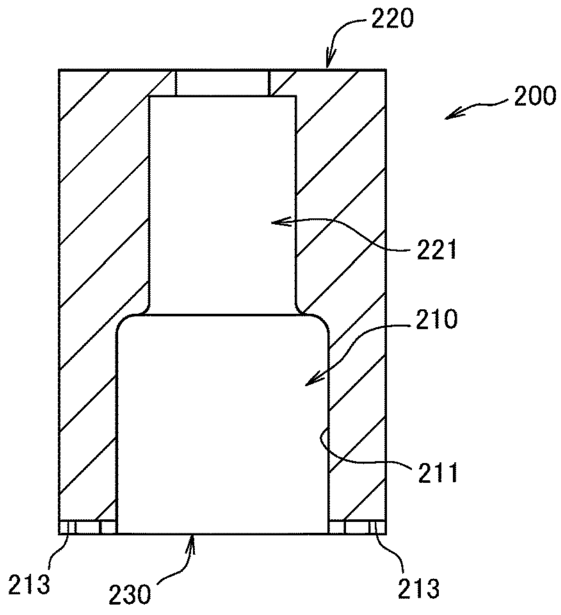

Next, FIG. 2 illustrates an upper housing 200 constituting the housing 300 according to the first embodiment of the invention of the present application. FIG. 2(*a*) is an overall perspective view of the upper housing 200, FIG. 2(*b*) is a plan view of the upper housing 200, and FIG. 2(*c*) is a cross-sectional view of the upper housing 200 taken along line B-B.

As shown in FIG. 2, the upper housing 200 is a substantially quadrangular prism body made of an insulator such as a synthetic resin, and forms a pair with the lower housing 100 shown in FIG. 1 to form the housing 300. A hollow upper accommodating portion 210 is provided inside, which upper accommodating portion 210 extends from the lower surface 230 toward the upper surface 220 of the upper housing 200, and is configured to accommodate a moving body 500 to be described later. Furthermore, the inner surface 211 of the upper accommodating portion 210 is a smooth surface so that the moving body 500 can slide inside in the up-down direction. As will be described later, the upper accommodating portion 210 is arranged vertically with the lower accommodating portion 110 of the lower housing 100 to constitute an accommodating portion 310 extending linearly, and the moving body 500 can move vertically in the accommodating portion 310.

Furthermore, an insertion portion 213 recessed in accordance with the shape of a base piece 430 is provided on a part of the lower surface 230 so that the base piece 430 of the to-be-cut part 400 described later can be inserted. The insertion portion 213 is disposed so as to face both sides of the upper accommodating portion 210, and is disposed at a position corresponding to the placement portion 113 of the lower housing 100. Therefore, the insertion portion 213 is fitted from above to the base piece 430 of the to-be-cut part 400 placed on the placement portion 113 of the lower housing 100.

In addition, a power source accommodating portion 221 in which the power source P is accommodated is formed in a part of the upper surface 220 side of the upper housing 200.

The power source accommodating portion 221 communicates with the upper end side of the upper accommodating portion 210. As will be described in detail later, power such as air pressure generated from the power source P accommodated in the power source accommodating portion 221 is transmitted to the moving body 500 in the upper accommodating portion 210 to move the moving body 500. The lower housing 100 and the upper housing 200 are substantially quadrangular prismatic bodies made of synthetic resin, but are not limited thereto, and may have any shape made of other materials as long as they have high insulating properties and strength that can withstand use.

Figure 3A:
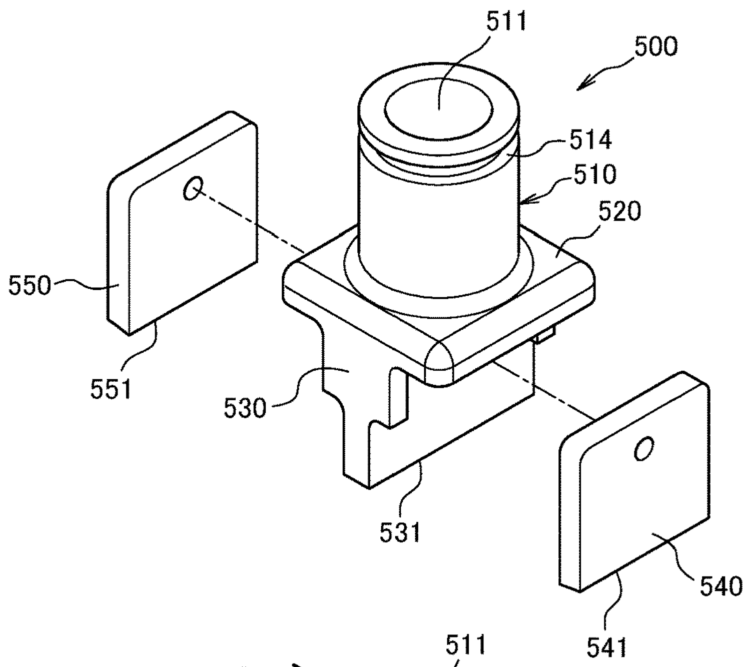
FIG. 3(*a*) is an exploded perspective view of a moving body of the electric circuit cut-off device according to the first embodiment of the invention of the present application, FIG. 3(*b*) is a perspective view of the moving body, and FIG. 3(*c*) is a cross-sectional view taken along line C-C.
Figure 3B:
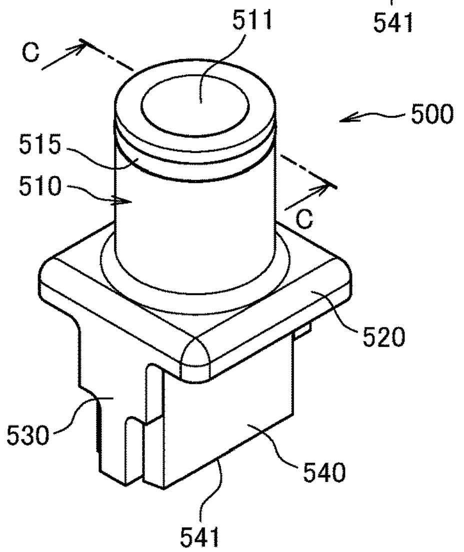
Figure 3C:
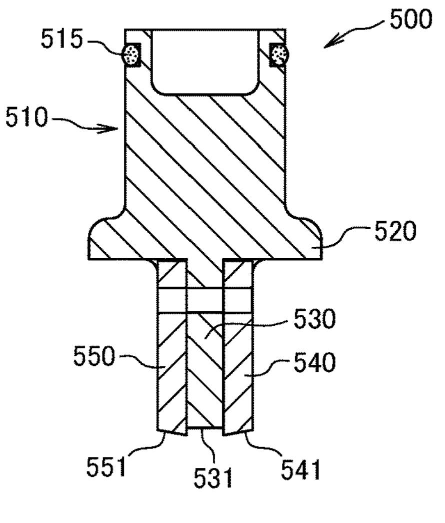

Next, the moving body 500 according to the first embodiment of the invention of the present application is illustrated in FIG. 3. FIG. 3(*a*) is an exploded perspective view of the moving body 500, FIG. 3(*b*) is a perspective view of the moving body 500, and FIG. 3(*c*) is a cross-sectional view taken along line C-C.

As illustrated in FIG. 3, the moving body 500 is formed of an insulator such as synthetic resin, and includes a main body 510 of a substantially cylindrical body on the upper end side, a sliding portion 520 of a flat quadrangular shape on the center, and a protruding portion 530 protruding downward on the lower end side. A recessed portion 511 is provided at the upper end of the main body 510, which recessed portion 511 is a portion facing the power source P. The sliding portion 520 has a shape corresponding to the inner surface shape of the accommodating portion 310, and the sliding portion 520 slides on the inner surface of the accommodating portion 310, so that the moving body 500 can smoothly slide while maintaining a posture along the inner side of the accommodating portion 310. A groove 514 is formed on the outer periphery of a part of the main body 510, and an O-ring (elastically deformable synthetic resin ring) is fitted into the groove 514. Therefore, as described later, the air pressure due to the explosion of the power source P is prevented from leaking from the space formed by the recessed portion 511.

Two plate-like electrode parts 540 and 550 are fixed to both sides of the protruding portion 530. The pair of electrode parts (540, 550) are connected to terminals of a fuse to be described later, respectively, and is formed of a conductor of metal such as copper so as to be conductive with a part of the to-be-cut part 400. Since the electrode part 540 and the electrode part 550 are fixed to both sides with the protruding portion 530 formed of an insulator in between, the electrode part 540 and the electrode part 550 are not electrically connected to each other and are in an independent state.

The protruding portion 530 has a plate shape, and the lower end 531 extends linearly. The lower end 541 of the electrode part 540 and the lower end 551 of the electrode part 550 also extend linearly and cross the to-be-cut part 400 described later in the width direction, so that the electrode part 540 and the electrode part 550 cause a part of the to-be-cut part 400 to easily cut. The lower end 541 of the electrode part 540 and the lower end 551 of the electrode part 550 protrude downward than the lower end 531 of the protruding portion 530. Furthermore, the lower end 541 of the electrode part 540 and the lower end 551 of the electrode part 550 are inclined obliquely downward from the outer side toward the lower end 531 side of the protruding portion 530 on the center inner side, so that it is easy to cut into the to-be-cut part 400.

Note that the moving body 500 is formed of a synthetic resin, but is not limited thereto, and may have any shape made of another material as long as it has high insulating properties and strength that can withstand use. Furthermore, the pair of electrode parts 540 and 550 are formed in a plate shape, but is not limited thereto, and may have any shape as long as it can be conductive with a part of the to-be-cut part 400.

Figure 4A:
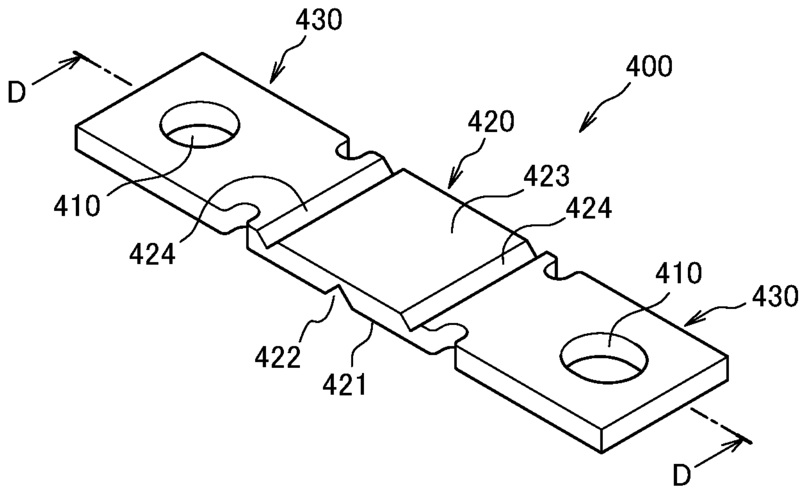
FIG. 4(*a*) is a perspective view of a to-be-cut part of the electric circuit cut-off device according to the first embodiment of the invention of the present application, and FIG. 4(*b*) is a cross-sectional view taken along line D-D.
Figure 4B:
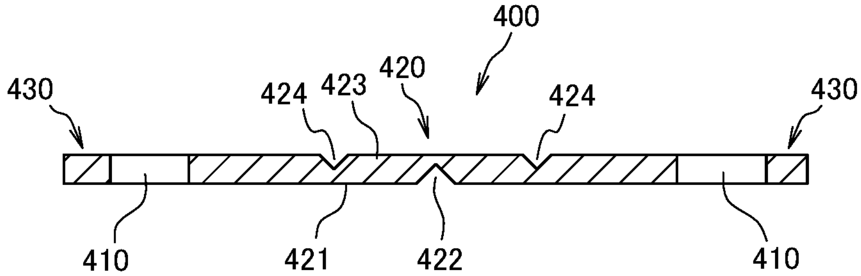

Next, FIG. 4 illustrates a to-be-cut part 400 constituting a part of the electric circuit cut off by the electric circuit cut-off device 600 according to the first embodiment of the invention of the present application. FIG. 4(*a*) is a perspective view of the to-be-cut part 400, and FIG. 4(*b*) is a cross-sectional view taken along line D-D.

The to-be-cut part 400 is entirely a conductor made of metal such as copper in order to electrically connect to the electric circuit, and includes a base piece 430 for connecting to the electric circuit at both ends and a cut piece 420 located between the base pieces 430. A connection hole 410 used for connection with an electric circuit is formed at an end portion of the base piece 430. In addition, a linear cut 422 is provided on the back surface 421 at substantially the center of the cut piece 420 so as to traverse in the width direction of the to-be-cut part 400, and the cut piece 420 is easily cut at substantially the center. Furthermore, a surface 423 of a boundary portion between the cut piece 420 and the base piece 430 is provided with a linear cut 424 so as to traverse in the width direction of the to-be-cut part 400 to facilitate bending of the cut piece 420 downward. Note that the to-be-cut part 400 is not limited to the shape illustrated in FIG. 4, and may have any shape as long as it includes the base piece 430 for electrically connecting to the electric circuit and the cut piece 420 located between the base pieces 430. In addition, although the cross-sectional area of a part of the cut piece 420 is minimized by the cut (422, 424) to facilitate cutting, the shape and position of the cut (422, 424) can be appropriately changed according to the configuration of the moving body 500 to facilitate cutting by the moving body 500.

Figure 5:
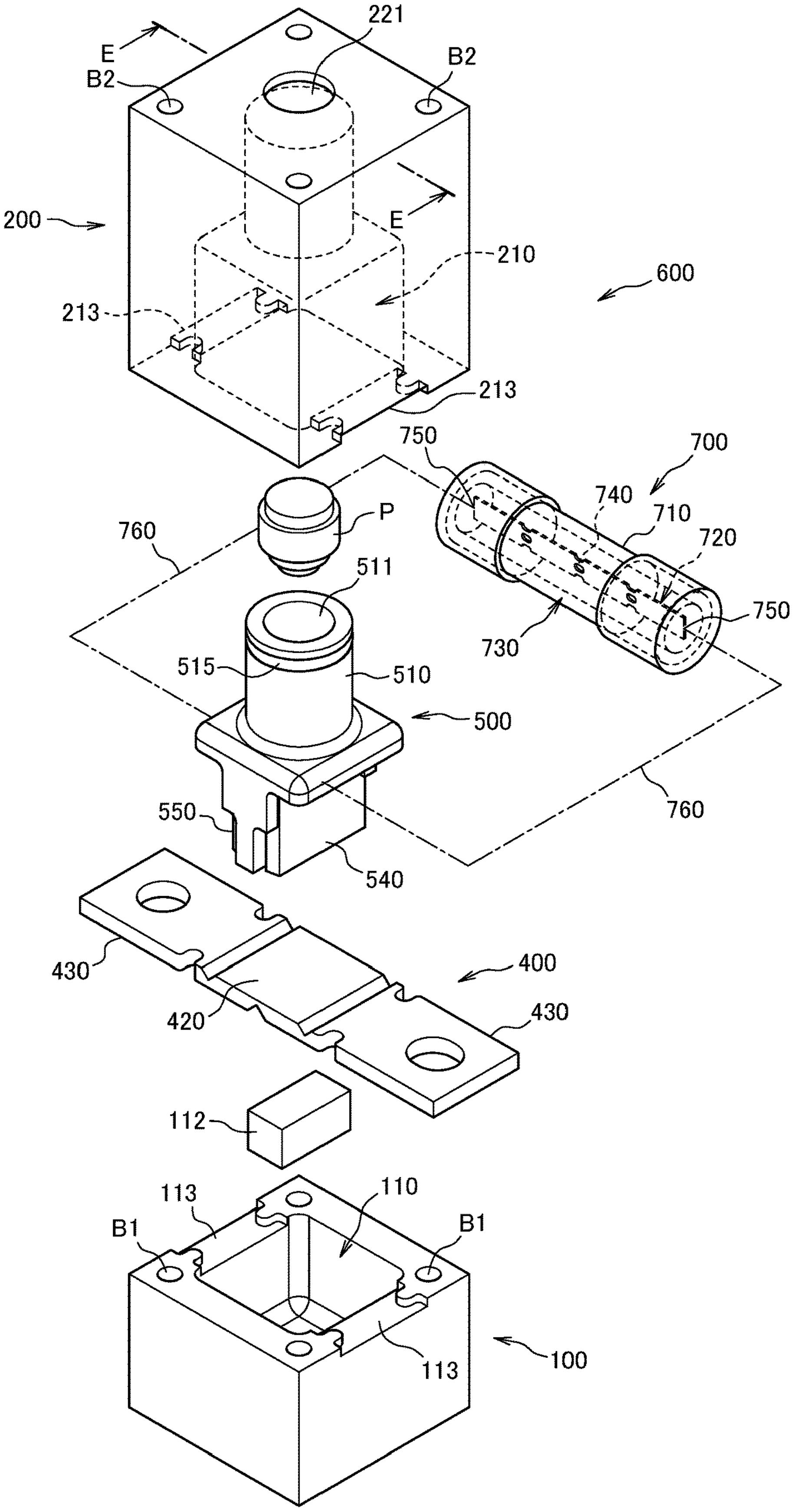
FIG. 5 is an exploded perspective view of the electric circuit cut-off device according to the first embodiment of the invention of the present application.

Next, the manner of assembling the electric circuit cut-off device 600 of the invention of the present application will be described with reference to FIG. 5. FIG. 5 is an exploded perspective view of the electric circuit cut-off device 600.

When assembling the electric circuit cut-off device 600, first, the abutment base 112 formed of an insulator is fixed to the bottom portion of the lower accommodating portion 110 of the lower housing 100. Next, the base piece 430 of the to-be-cut part 400 is placed on the placement portion 113 of the lower housing 100, and the to-be-cut part 400 is arranged such that the cut piece 420 crosses the lower accommodating portion 110 of the lower housing 100.

Next, the upper housing 200 is fitted from above the lower housing 100 such that the main body 510 side of the moving body 500 is inserted into the upper accommodating portion 210 of the upper housing 200. Then, the insertion portion 213 of the upper housing 200 is fitted to the base piece 430 of the to-be-cut part 400. Then, by coupling and fixing the coupling hole B1 and the coupling hole B2 aligned vertically by a coupling tool or the like, the housing 300 including the lower housing 100 and the upper housing 200 is assembled in a state where the to-be-cut part 400 and the moving body 500 are accommodated therein.

Furthermore, the power source P is attached to the power source accommodating portion 221 of the upper housing 200, and a part of the power source P is accommodated in the recessed portion 511 of the moving body 500. When an abnormality signal is input from the outside when an abnormality of the electric circuit is detected, for example, the power source P explodes explosives in the power source P, and instantaneously pushes out and moves the moving body

500 in the accommodating portion 310 by air pressure caused by the explosion. Note that the power source P is not limited to a power source using explosives as long as it generates power for moving the moving body 500, and other known power sources may be used.

The electric circuit cut-off device 600 also includes a fuse 700. The fuse 700 includes a fuse element 720 made of a conductive metal such as copper or an alloy thereof in a hollow and insulating casing 710, and an arc-extinguishing material 730 is filled around the fuse element 720 inside the casing 710. The terminals 750 on both sides of the fuse element 720 are electrically connected to the pair of electrode parts 540 and 550 by connection members 760 such as electric wires. In addition, the fuse element 720 includes a fusing portion 740 between the terminals 750, which fusing portion 740 is a portion where the width of the fuse element 720 is locally narrowed, and is configured to generate heat and fuse to cut off the current when the current to be cut off by the electric circuit cut-off device flows.

The arc-extinguishing material 730 is a granular arc-extinguishing material made of silica sand or the like, or a gaseous arc-extinguishing material made of nitrogen gas or the like, and is configured to extinguish an arc generated between the terminals 750 after the fusion of the fusing portion 740. As the fuse 700, a conventional existing product can be used, and a fuse having arc-extinguishing performance corresponding to a current or a voltage at which the electric circuit cut-off device is to cut off can be appropriately adopted. The fuse 700 can be attached to any place of the housing 300.

Figure 6:
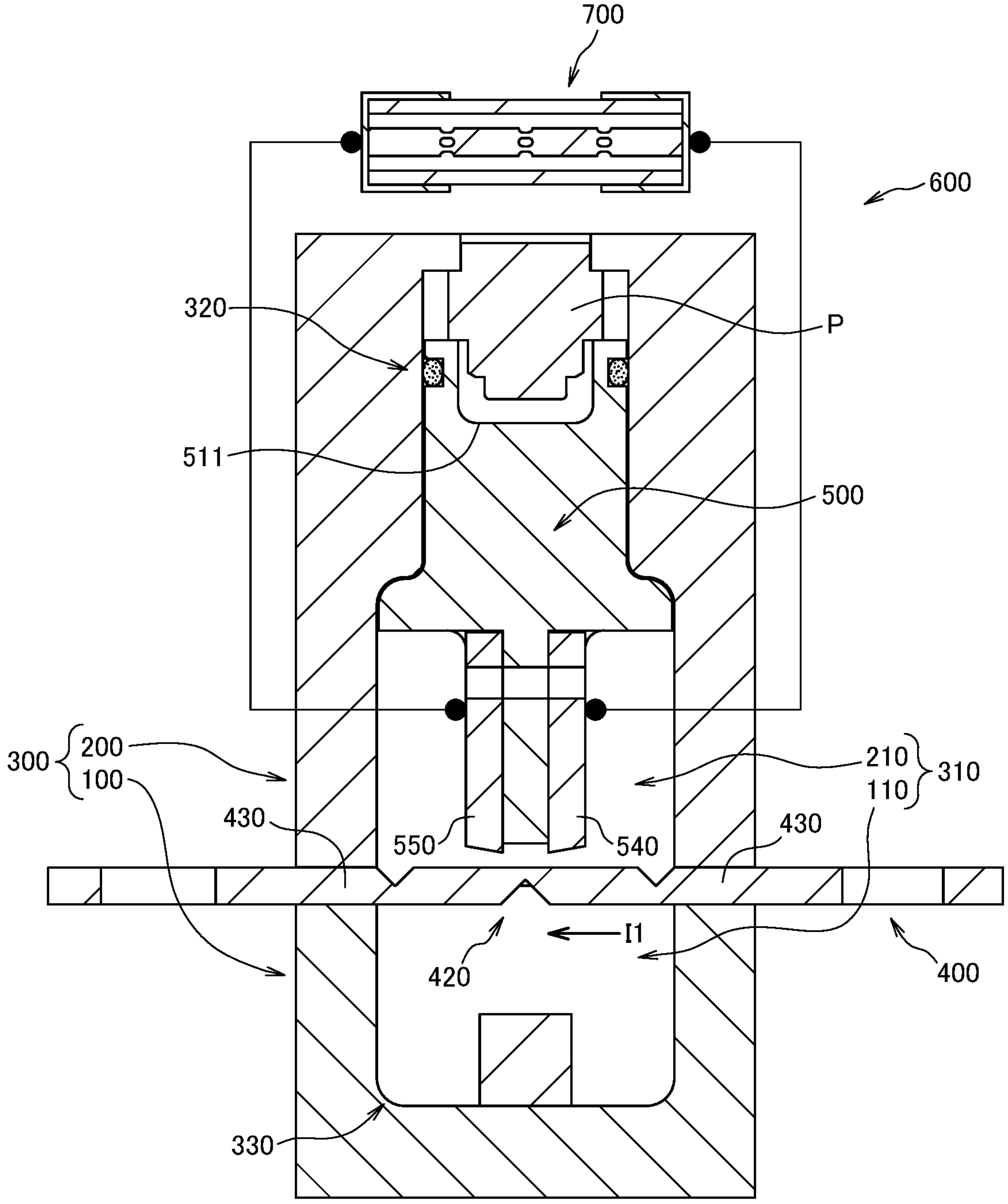
FIG. 6 is a cross-sectional view taken along line E-E in a state where the electric circuit cut-off device according to the first embodiment of the invention of the present application is assembled.

Next, an internal structure of the electric circuit cut-off device 600 according to the first embodiment of the invention of the present application will be described with reference to FIG. 6. FIG. 6 is a cross-sectional view taken along line E-E in a state where the electric circuit cut-off device 600 illustrated in FIG. 5 is assembled.

As illustrated in FIG. 6, the moving body 500 is accommodated in the accommodating portion 310 including the linearly arranged lower accommodating portion 110 and upper accommodating portion 210. The accommodating portion 310 extends from the first end portion 320 of the housing 300 to the second end portion 330 on the opposite side of the first end portion 320. Since the moving body 500 is arranged on the first end portion 320 side where the power source P is disposed, the second end portion 330 side of the accommodating portion 310 is a cavity. Therefore, as will be described later, the moving body 500 can move toward the second end portion 330 while cutting the cut piece 420. In addition, since the recessed portion 511 on the upper end side of the moving body 500 is adjacent to the power source P, the air pressure caused by the explosion of the gunpowder in the power source P is transmitted to the upper end side of the moving body 500 as will be described later.

As illustrated in FIG. 6, the assembled and completed electric circuit cut-off device 600 is used by being attached in an electric circuit to be protected. Specifically, the base piece 430 of the to-be-cut part 400 is connected to a part of the electric circuit, so that the to-be-cut part 400 constitutes a part of the electric circuit. At a normal time, the base piece 430 and the cut piece 420 of the to-be-cut part 400 are not cut and are physically and electrically connected, so that current flows through the electric circuit via the base piece 430 and the cut piece 420 of the to-be-cut part 400. The pair of electrode parts 540 and 550 are arranged on the lower end side of the moving body 500 so as to face the to-be-cut part 400, but are separated from the to-be-cut part 400. Therefore, since the pair of electrode parts 540 and 550 are not physically or electrically connected to the to-be-cut part 400, the current flowing through the electric circuit does not flow to the fuse 700 via the electrode parts 540 and 550. As a result, current in the electric circuit can be prevented from constantly flowing to the fuse 700, and heat generation and deterioration of the fuse 700 can be prevented. As will be described later, the electric circuit cut-off device 600 can guide an arc generated when the electric circuit is cut off to the fuse 700 to effectively and quickly extinguish the arc, and hence the arc-extinguishing material for extinguishing the arc is not enclosed in the accommodating portion 310 (in particular, around the cut piece 420). Basically, it is not necessary to enclose the arc-extinguishing material in the accommodation portion 310, but the arc-extinguishing material may be enclosed in the accommodation portion 310 depending on the specification.

Next, a state in which the electric circuit cut-off device 600 cuts off the electric circuit when an abnormality such as overcurrent flowing through the electric circuit is detected will be described with reference to FIGS. 7 to 9. Note that FIGS. 7 to 9 are cross-sectional views illustrating a state in which the moving body 500 has moved from the state illustrated in FIG. 6.

Figure 7:
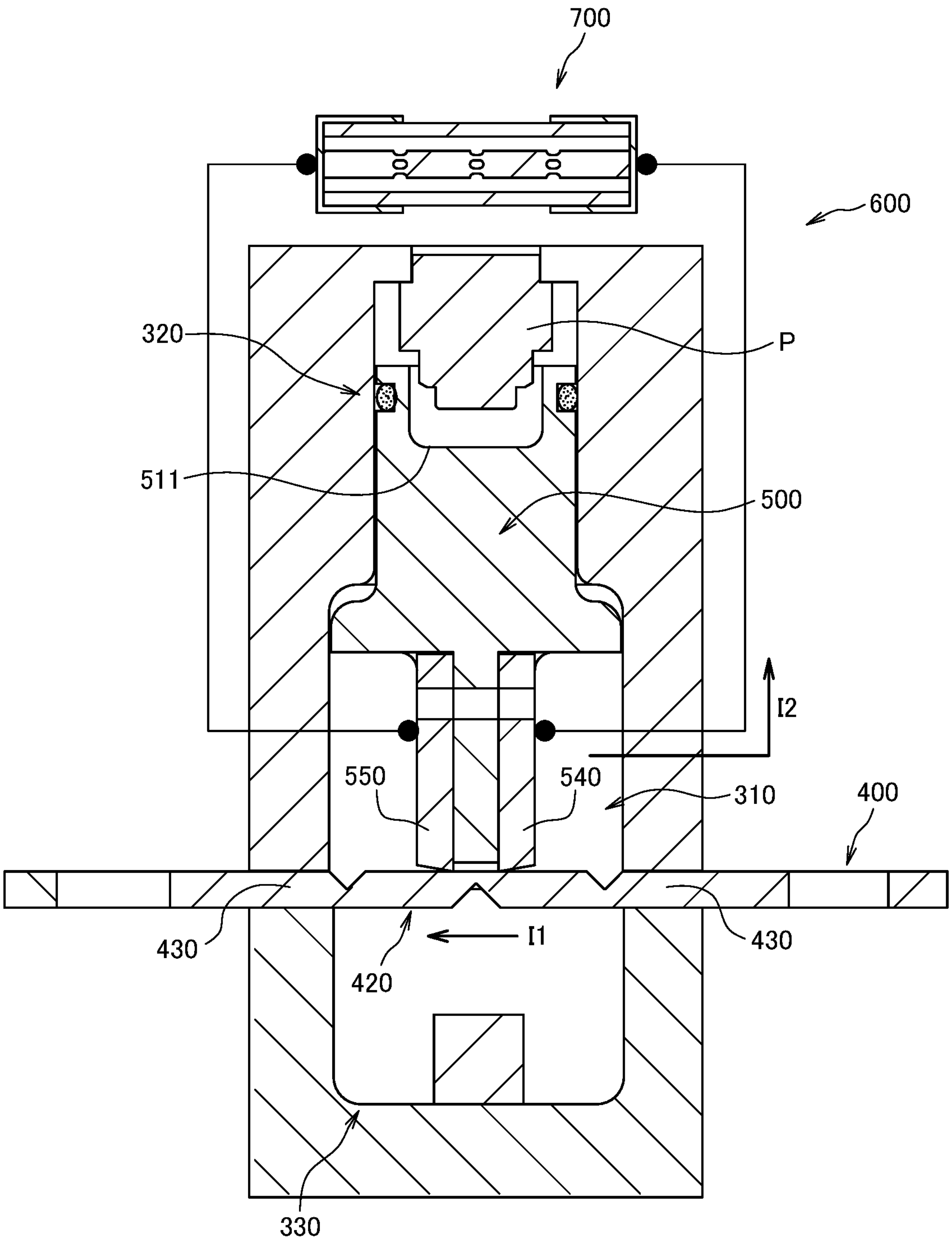
FIG. 7 is a cross-sectional view illustrating a state in which the moving body has moved from the state illustrated in FIG. 6 in the electric circuit cut-off device according to the first embodiment of the invention of the present application.

First, as illustrated in FIG. 7, when an abnormality such as overcurrent flowing through the electric circuit is detected, an abnormality signal is input to the power source P, and the gunpowder in the power source P explodes. Then, the air pressure due to the explosion is transmitted to the recessed portion 511 on the upper end side of the moving body 500. Then, the moving body 500 is vigorously blown off from the first end portion 320 toward the second end portion 330 by the air pressure, and instantaneously moves through the accommodating portion 310 toward the second end portion 330.

Then, the pair of electrode parts 540 and 550 arranged on the lower end side of the moving body 500 come into contact with the cut piece 420 of the to-be-cut part 400. Therefore, the fuse 700 is in a state of being energized with a part of the to-be-cut part 400 through the electrode part 540 and the electrode part 550, and a part 12 of the current I1 flowing through the electric circuit flows to the fuse 700. In the state illustrated in FIG. 7, the cut piece 420 is not cut by the moving body 500, and is physically and electrically connected to the base piece 430. That is, in a state where the base pieces 430 on both sides of the to-be-cut part 400 are energized via the cut piece 420, a part of the to-be-cut part 400 is in contact with the pair of electrode parts 540 and 550 and is connected to the fuse 700.

Figure 8:
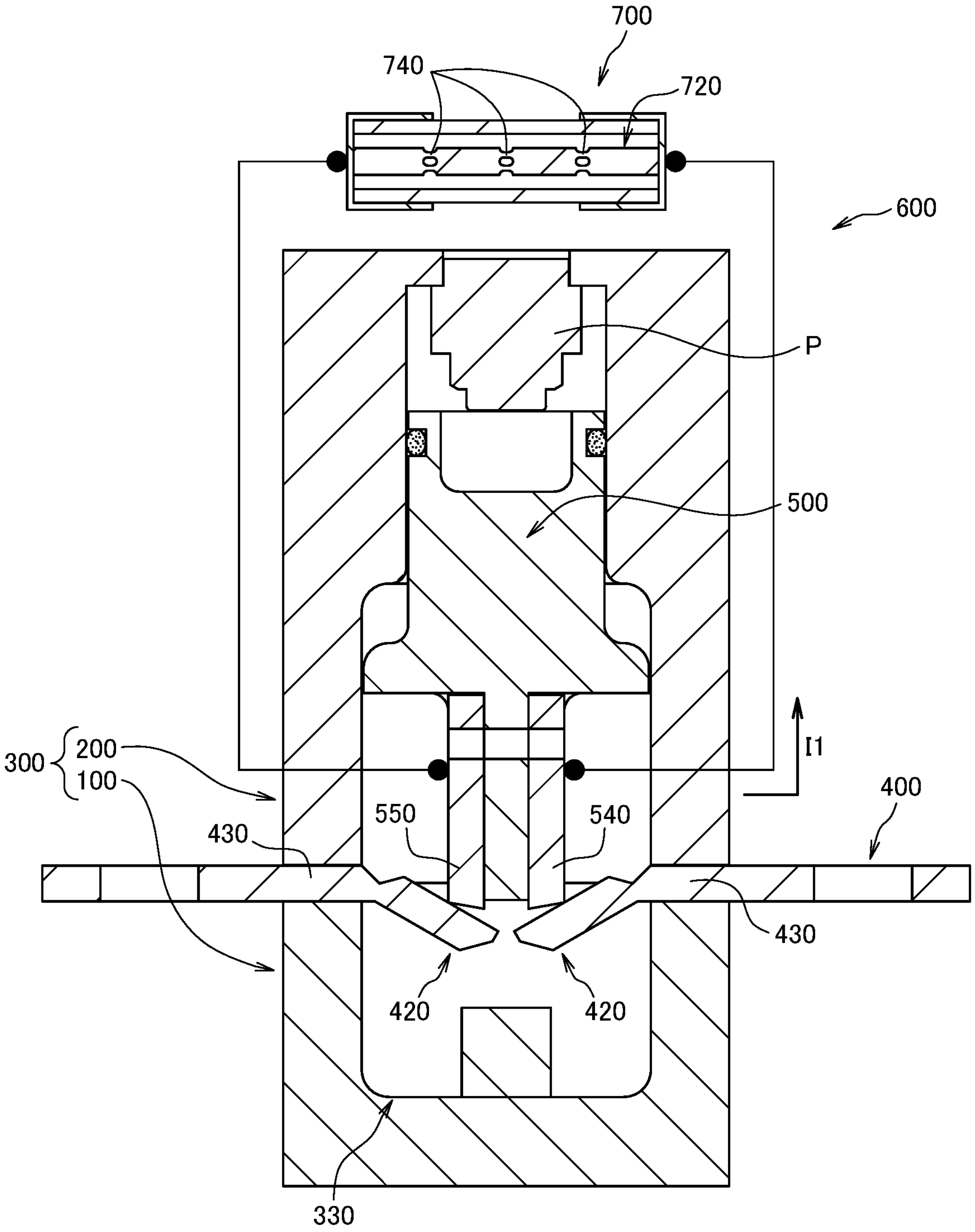
FIG. 8 is a cross-sectional view illustrating a state in which the moving body has moved from the state illustrated in FIG. 6 in the electric circuit cut-off device according to the first embodiment of the invention of the present application.
Figure 9:
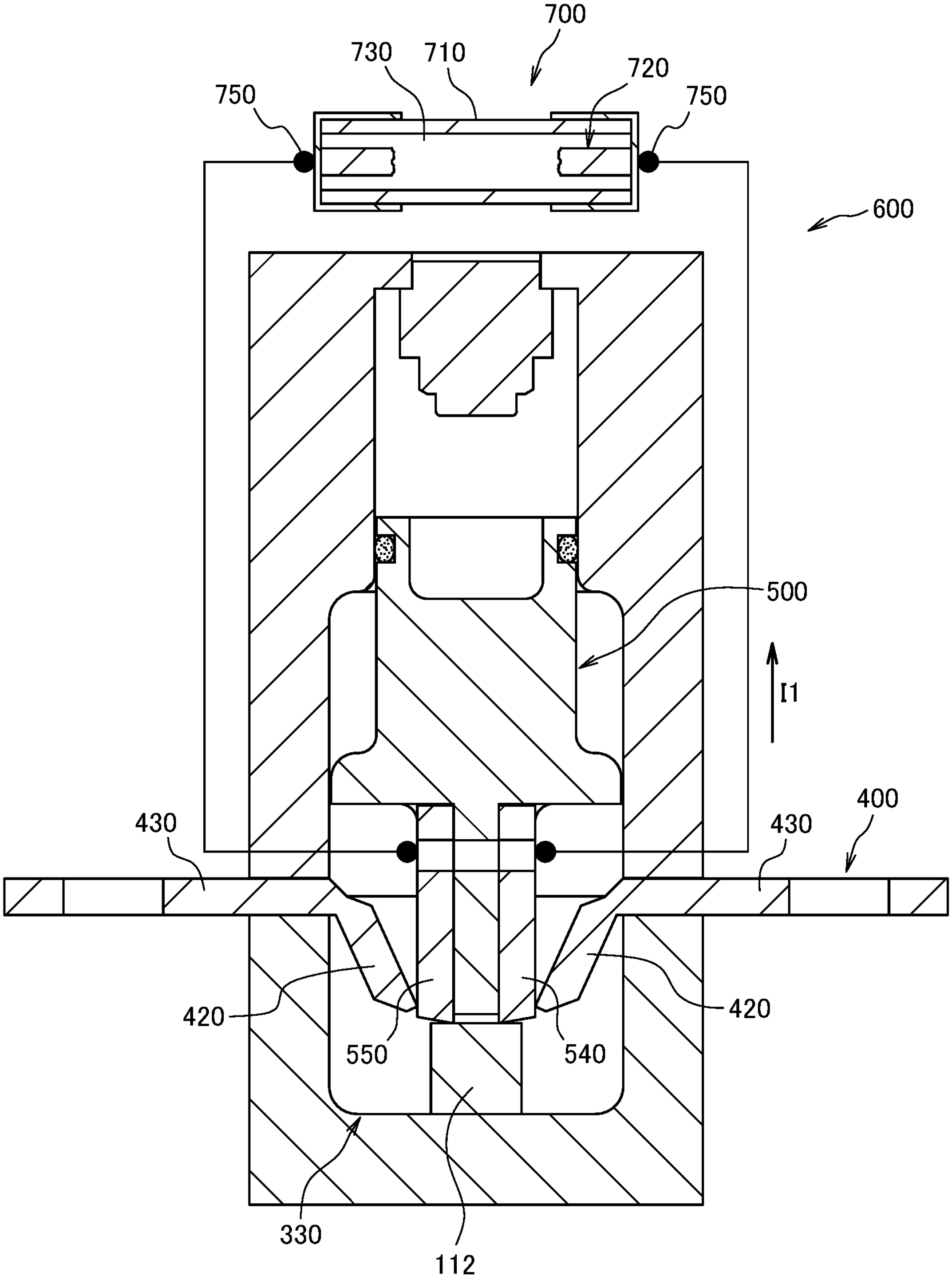
FIG. 9 is a cross-sectional view illustrating a state in which the moving body has moved from the state illustrated in FIG. 6 in the electric circuit cut-off device according to the first embodiment of the invention of the present application.

Next, as illustrated in FIG. 8, when the moving body 500 further moves toward the second end portion 330, the cut piece 420 is strongly pushed downward by the electrode part 540 and the electrode part 550 of the moving body 500. Then, the cut piece 420 is divided around substantially the center, and the base pieces 430 on both sides are physically cut. That is, the state in which the base pieces 430 on both sides of the to-be-cut part 400 are energized via the cut piece 420 is cut off, and an overcurrent can be prevented from flowing to the electric circuit.

In addition, since a voltage is applied to the base pieces 430 on both sides connected to the electric circuit, there is a possibility that an arc may generate between the base pieces 430, more strictly, between the divided cut pieces 420. However, as illustrated in FIGS. 7 to 8, the pair of electrode parts 540 and 550 are brought into contact with a part of the to-be-cut part 400 to connect the to-be-cut part 400 and the fuse 700, and then the cut piece 420 of the to-be-cut part 400 is cut, so that when the cut piece 420 is cut, a current I1 (fault current) flowing through the electric circuit is guided to the fuse 700 through the electrode parts 540 and 550. Therefore, generation of an arc between the divided cut pieces 420 can be prevented.

As illustrated in FIG. 9, the fusing portion 740 of the fuse 700 guided to the fuse 700 generates heat and fuses. When the cut piece 420 is cut by the moving body 500 to cut off the electric circuit, the current I1 is guided to the fuse 700, and the current flows in the electric circuit, so that, strictly speaking, the electric circuit is not completely cut off. However, since the rating of the fusing portion 740 of the fuse 700 is reduced, the fusing portion 740 is immediately fused by the current I1, and the electric circuit is immediately completely cut off.

Furthermore, after the fusing portion 740 is fused, an arc is generated between the terminals 750 of the fuse 700 by the voltage applied to the base pieces 430 on both sides connected to the electric circuit, but the arc is quickly and effectively extinguished by the arc-extinguishing material 730 in the fuse 700. In FIG. 9, the moving body 500 further moves toward the second end portion 330, and the lower end of the moving body 500 abuts on the abutment base 112, so that the moving body 500 stops. Since the abutment base 112 is located between the cut pieces 420, even if a voltage is unexpectedly applied between the base pieces 430, an arc is generated between the cut pieces 420, and the cut pieces 420 on both sides can be prevented from being energized.

As illustrated in FIGS. 7 to 9, the pair of electrode parts 540 and 550 extend along the moving direction of the moving body 500. Therefore, during a period from when the pair of electrode parts 540 and 550 come into contact with a part of the to-be-cut part 400 until the cut piece 420 is cut, the electrode parts 540 and 550 constantly maintain a state of being in contact with a part of the to-be-cut part 400 while moving toward the second end portion 330, and a state in which the to-be-cut part 400 is connected to the fuse 700 is also constantly maintained. In particular, by providing the electrode part 540 and the electrode part 550 on the moving body 500, the electrode part 540 and the electrode part 550 can be moved to be inserted as they are into a location where the moving body 500 has cut the cut piece 420, so that the electrode part 540 and the electrode part 550 can easily maintain a state of being in contact with a part of the to-be-cut part 400 at all times.

As described above, according to the electric circuit cut-off device 600 of the invention of the present application, the current (fault current) flowing to the electric circuit when the electric circuit is cut off is guided to the fuse 700, and the arc generated by the guided current can be effectively and quickly extinguished in the fuse 700. In particular, the voltage applied to the electric circuit tends to increase by the recent improvement in performance of automobiles and the like (e.g., the voltage reaches 500 V to 1000 V), and in the conventional technique, it is necessary to extinguish the arc spreading in a wide range generated between the cut pieces 420 and the base pieces 430 having a large cross-sectional area when the electric circuit is cut off, and thus the amount of the arc-extinguishing material to be enclosed in the housing 300 increases, and the size and weight of the electric circuit cut-off device 600 may increase. However, according to the electric circuit cut-off device 600 of the invention of the present application, the current (fault current) flowing when the electric circuit is cut off is guided to the fuse 700, and is immediately cut off by the fusing portion 740 of the fuse 700, and thereafter an arc is generated in the narrow and limited casing 710 in the fuse 700, and the arc can be quickly and effectively extinguished by the arc-extinguishing material 730.

In addition, the fuse 700 has a usage history and reliability in products that have been used for many years, and there are various types of fuses 700. Therefore, in the electric circuit cut-off device 600 of the invention of the present application, the arc-extinguishing performance is stably and reliably exhibited by using the fuse 700, and a change in the voltage or current value to be cut off by the electric circuit cut-off device 600 or a change in the arc-extinguishing performance can be easily responded by appropriately selecting the fuse 700. In particular, change in the specification can be responded by changing the fuse 700, and thus making the portion of the electric circuit cut-off device 600 other than the fuse 700 common contributes to reduction in manufacturing cost.

Furthermore, when the electric circuit cut-off device 600 cuts off the electric circuit, as shown in FIG. 7, in a state where the base pieces 430 on both sides of the to-be-cut part 400 are energized via the cut pieces 420, the to-be-cut part 400 is connected to the fuse 700 through the pair of electrode parts 540 and 550, and thereafter, as shown in FIG. 8, accompanying the movement of the moving body 500, the cut piece 420 is cut, and a state where the base pieces 430 on both sides of the to-be-cut part 400 are energized via the cut pieces 420 is cut off. That is, since the state in which the to-be-cut part 400 and the fuse 700 are connected is secured before the state in which the to-be-cut part 400 is energized is cut off and an arc due to a fault current is generated between the base pieces 430 on both sides, the arc due to the fault current can be reliably guided to the fuse 700 and extinguished in the fuse 700. As a result, in the housing 300, it is possible to prevent the arc due to a fault current from generating between the base pieces 430 and the electric circuit cut-off device 600 from damaging, and the electric circuit can be safely cut off.

In addition, since the electrode part 540 and the electrode part 550 are provided in the moving body 500 that cuts the cut piece 420 of the to-be-cut part 400, the timing of energizing the fuse 700 and cutting the cut piece 420 can be easily set (specifically, the order of energization and cutting is secured), and the configuration can be simplified. That is, by providing the electrode part 540 and the electrode part 550 at a portion where cutting of the cut piece 420 is to be performed, accompanying a simple operation in which the moving body 500 moves, a step in which the electrode part 540 and the electrode part 550 are brought into contact with the to-be-cut part 400 and are energized with the fuse 700 and a step in which the cut piece 420 is cut by a part of the moving body 500 thereafter can be reliably and easily realized in this order, and an electric circuit can be safely cut off.

As illustrated in FIGS. 3, 7, and 8, the lower end 541 of the electrode part 540 and the lower end 551 of the electrode part 550 protrude downward from the lower end 531 of the protruding portion 530, so that the operation of cutting the cut piece 420 as it is after the electrode part 540 and the electrode part 550 come into contact with the cut piece 420 can be realized more easily and reliably accompanying the movement of the moving body 500. That is, since the portions that cut the to-be-cut part 400 are adopted as the electrode part 540 and the electrode part 550, the operation of cutting the cut piece 420 after the fuse 700 and the to-be-cut part 400 are energized via the electrode part can be realized more easily and reliably.

As illustrated in FIGS. 3, 7, and 8, the portions that cut the to-be-cut part 400 are adopted as the electrode part 540 and the electrode part 550, but this is not the sole case, and the portion that cuts the to-be-cut part 400 may be any location as long as it is a part of the moving body 500. For example, the lower end 531 of the protruding portion 530 shown in FIG. 3 is pointed to protrude downward from the lower end 541 of the electrode part 540 and the lower end 551 of the electrode part 550, and a cut 422 shown in FIG. 4 is provided on the surface 423 side. Then, as illustrated in FIG. 7, when the moving body 500 moves, the pointed lower end 531 of the protruding portion 530 enters the cut 422 of the cut piece 420, the electrode part 540 and the electrode part 550 come into contact with the cut piece 420, and thereafter, the lower end 531 of the protruding portion 530 cuts the cut piece 420 together with the movement of the moving body 500.

In addition, as illustrated in FIGS. 8 and 9, since the electrode part 540 and the electrode part 550 are physically and electrically separated from each other, the current I1 (fault current) always flows through the fuse 700. Therefore, the energy of the current I1 is effectively consumed by the fuse 700. Furthermore, the fuse 700 can be arranged anywhere as long as it is a part of the electric circuit cut-off device 600, for example, the fuse 700 can be fixed to a part of the housing 300 or the fuse 700 can be built in the moving body 500. When the fuse 700 is disposed in the housing 300, the fuse 700 is less likely to be affected by an impact due to the movement of the moving body 500 and is less likely to be damaged. The fuse 700 can be easily changed without disassembling the moving body 500 and the housing 300.

Second Embodiment

Figure 10:
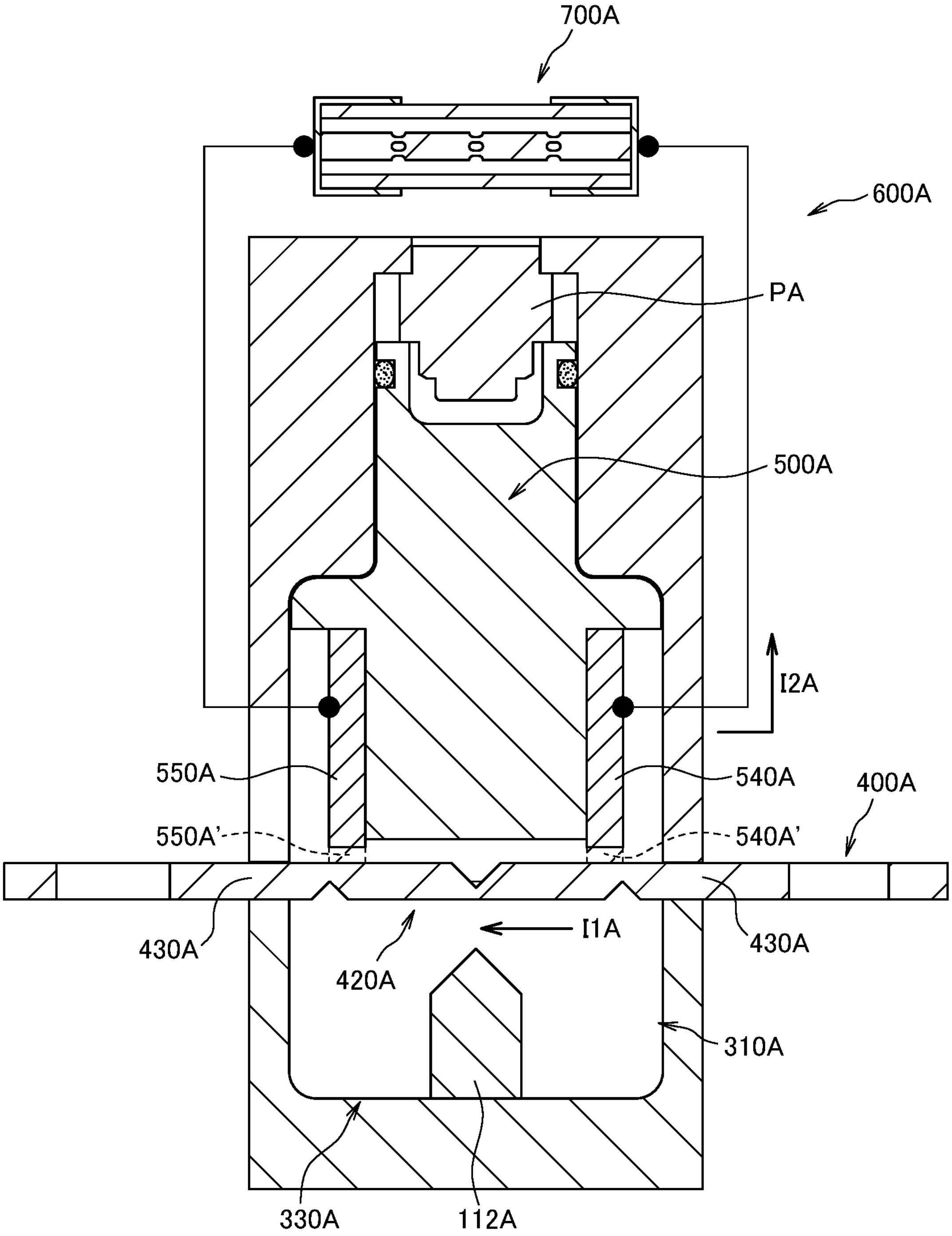
FIG. 10 is a cross-sectional view of an electric circuit cut-off device according to a second embodiment of the invention of the present application.
Figure 11:
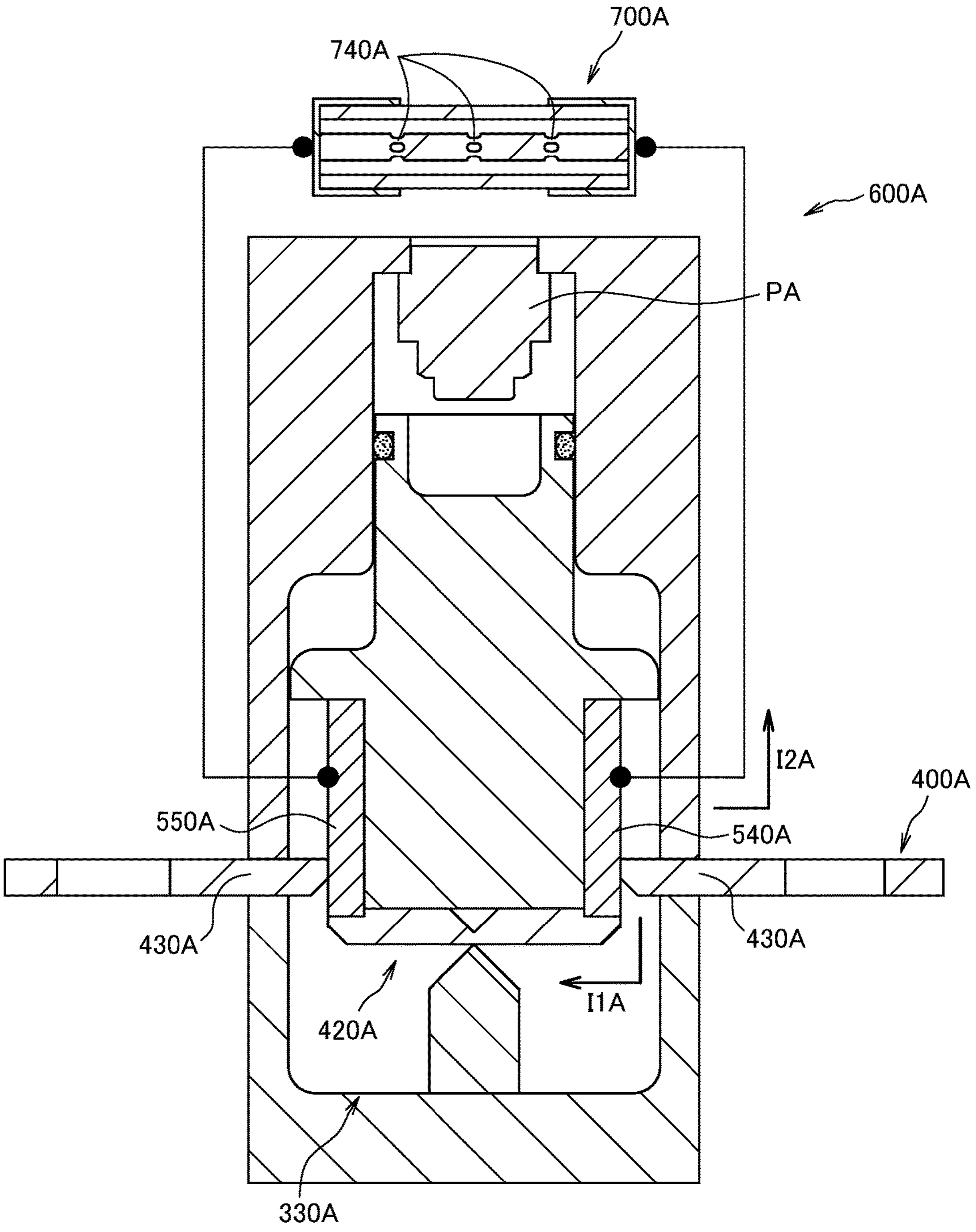
FIG. 11 is a cross-sectional view of the electric circuit cut-off device according to the second embodiment of the invention of the present application.
Figure 12:
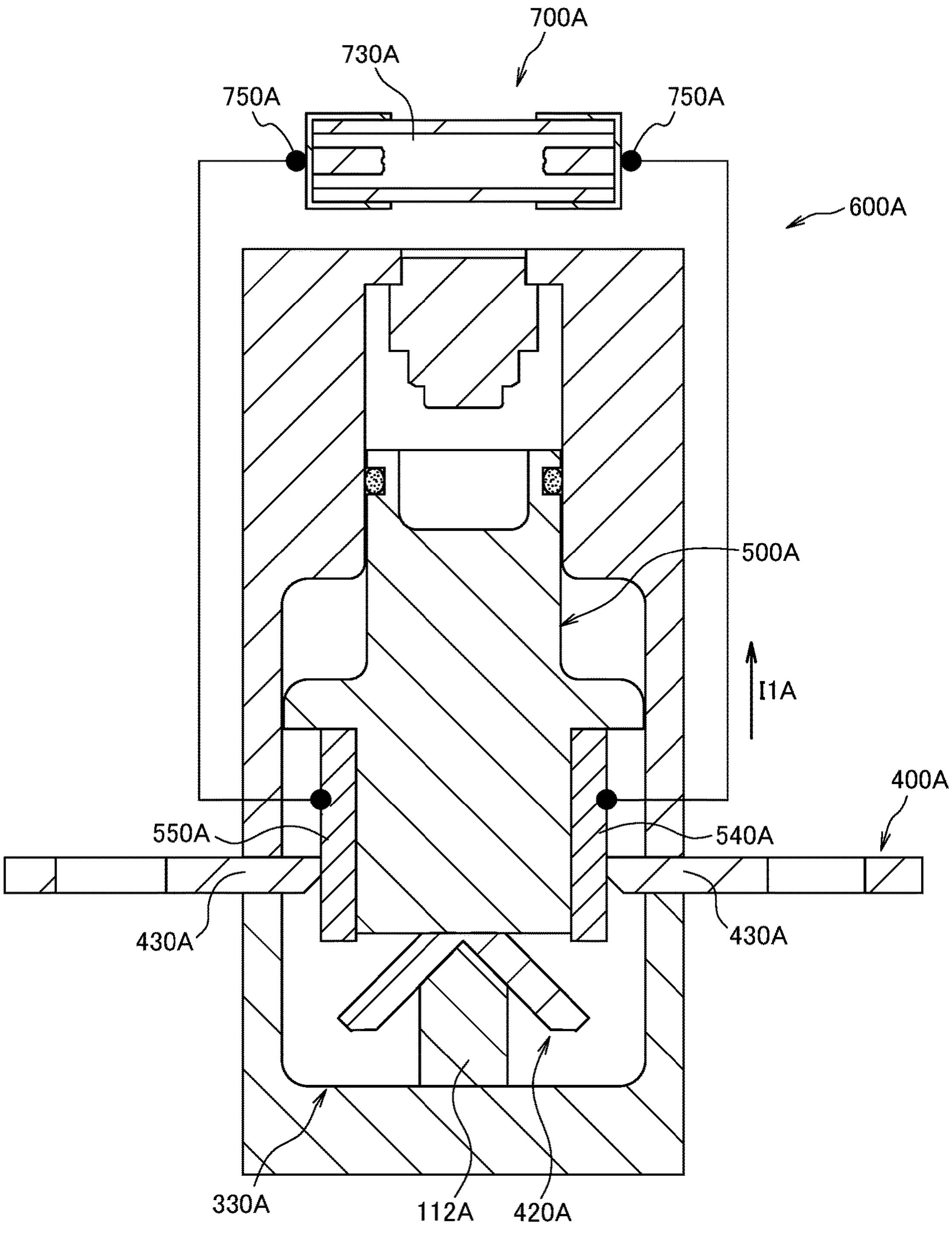
FIG. 12 is a cross-sectional view of the electric circuit cut-off device according to the second embodiment of the invention of the present application.

Next, an electric circuit cut-off device 600A of the invention of the present application according to a second embodiment will be described with reference to FIGS. 10 to 12. Note that FIGS. 10 to 12 illustrate cross-sectional views of the electric circuit cut-off device 600A according to the second embodiment, similarly to the cross-sectional view of the electric circuit cut-off device 600 according to the first embodiment illustrated in FIG. 6. The configuration of the electric circuit cut-off device 600A according to the second embodiment is basically the same as the configuration of the electric circuit cut-off device 600 according to the first embodiment except for the configurations of the electrode part 540A, the electrode part 550A, and the abutment base 112A, and thus, the description of the same configuration will be omitted.

As illustrated in FIG. 10, the electrode part 540A and the electrode part 550A are separated from each other so as to be arranged not at a position facing the vicinity of substantially the center of the cut piece 420A (see FIG. 6) but at a position facing the vicinity of the coupling location between the cut piece 420A and the base piece 430A. At a normal time, since the base piece 430A and the cut piece 420A of the to-be-cut part 400A are not cut and are physically and electrically connected, the current I1A flows through the electric circuit via the base piece 430A and the cut piece 420A of the to-be-cut part 400A. The pair of electrode parts 540A and 550A are disposed at the lower end of the moving body 500A so as to face the to-be-cut part 400A, but are separated from the to-be-cut part 400A. Therefore, since the pair of electrode portions 540A and 550A are not physically or electrically connected to the to-be-cut part 400A, the current flowing through the electric circuit does not flow to the fuse 700A through the electrode parts 540A and 550A.

Next, when an abnormality such as overcurrent flowing through the electric circuit is detected, an abnormality signal is input to the power source PA, the gunpowder in the power source PA explodes, and the moving body 500A instantaneously moves toward the second end portion 330A through the accommodating portion 310A. Then, the pair of electrode parts 540A' and 550A' arranged on the lower end side of the moving body 500A come into contact with the cut piece 420A of the to-be-cut part 400A. In FIG. 10, the electrode part 540A' and the electrode part 550A' after the movement are indicated by virtual lines.

Therefore, the fuse 700A is in a state energized with a part of the to-be-cut part 400A through the electrode part 540A' and the electrode part 550A', and a part I2A of the current I1A flowing through the electric circuit flows to the fuse 700A. In addition, in the state illustrated in FIG. 10, the cut piece 420 A is not cut by the moving body 500A, and is physically and electrically connected to the base piece 430A. That is, a part of the to-be-cut part 400A is connected to the fuse 700A while the base pieces 430A on both sides of the to-be-cut part 400A remain energized via the cut pieces 420A.

Next, as illustrated in FIG. 11, when the moving body 500A further moves toward the second end portion 330A, the cut piece 420A is strongly pushed downward by the electrode part 540A and the electrode part 550A of the moving body 500A, and the cut piece 420A is cut in the vicinity of the coupling location between the cut piece 420A and the base piece 430A to be in a state of being physically separated from the base piece 430A. Even in this state, since the base pieces 430A on both sides are in contact with the electrode part 540A and the electrode part 550A and are electrically connected to the cut piece 420A through the electrode part 540A and the electrode part 550A, the current I1A flowing through the electric circuit flows between the base pieces 430A on both sides, and a part I2A of the current I1A flows to the fuse 700A. That is, a part of the to-be-cut part 400A is connected to the fuse 700A while the base pieces 430A on both sides of the to-be-cut part 400A remain energized via the cut pieces 420A.

Furthermore, as illustrated in FIG. 12, when the moving body 500A moves toward the second end portion 330A, the lower end of the moving body 500A abuts on the abutment base 112A, the moving body 500A stops, and the cut piece 420A is bent into a substantially dogleg-shape by the triangular distal end portion of the abutment base 112A. Therefore, the cut piece 420A is separated from the electrode part 540A and the electrode part 550A, and the cut piece 420A and the base pieces 430A on both sides are physically and electrically cut from each other. That is, the state in which the base pieces 430A on both sides of the to-be-cut part 400A are energized via the cut pieces 420A is cut off, and an overcurrent can be prevented from flowing through the electric circuit.

As illustrated in FIGS. 11 to 12, after the pair of electrode parts 540A and 550A are brought into contact with a part of the to-be-cut part 400A and the to-be-cut part 400A and the fuse 700 A are connected, the cut piece 420A of the to-be-cut part 400A is bent to cut off the electric circuit, so that when the state in which the to-be-cut part 400A is energized is cut off, a current I1A (fault current) flowing through the base piece 430A is guided to the fuse 700A through the electrode parts 540A and 550A. Therefore, generation of an arc between the base pieces 430 can be prevented.

As illustrated in FIG. 12, the current I1A guided to the fuse 700A quickly fuses the fusing portion 740A of the fuse 700A, and quickly cuts off the current flowing to the electric circuit. Furthermore, after the fusing portion 740 A is fused, an arc is generated between the terminals 750A of the fuse 700A by the voltage applied to the base pieces 430A on both sides connected to the electric circuit, but the arc is quickly and effectively extinguished by the arc-extinguishing material 730A in the fuse 700A. As illustrated in FIGS. 10 to 12, during a period from when the pair of electrode parts 540A and 550A are brought into contact with a part of the to-be-cut part 400A to when the cut piece 420A is cut, the electrode parts 540A and 550A always maintain a state of being in contact with a part of the to-be-cut part 400A while moving toward the second end portion 330A, so that a state in which the to-be-cut part 400A is connected to the fuse 700A is also always maintained.

As described above, according to the electric circuit cut-off device 600A of the invention of the present application, the current (fault current) flowing to the electric circuit when the electric circuit is cut off is guided to the fuse 700A, and the arc generated by the guided current can be effectively and quickly extinguished in the fuse 700A. In addition, since a state in which the to-be-cut part 400A and the fuse 700A are connected is secured before the state in which the to-be-cut part 400A is energized is cut off and an arc is generated between the base pieces 430A on both sides, the arc can be reliably guided to the fuse 700A and extinguished in the fuse 700A. As a result, it is possible to prevent the electric circuit cut-off device 600A from being damaged by generation of an arc due to a fault current between the base pieces 430A in the housing 300A, and to safely cut off the electric circuit.

Third Embodiment

Next, an electric circuit cut-off device 600B of the invention of the present application according to a third embodiment will be described with reference to FIGS. 13 to 16. Note that FIGS. 13 to 16 illustrate cross-sectional views of the electric circuit cut-off device 600B according to the third embodiment, similarly to the cross-sectional view of the electric circuit cut-off device 600A according to the second embodiment illustrated in FIG. 10. Furthermore, the configuration of the electric circuit cut-off device 600B according to the third embodiment is basically the same as the configuration of the electric circuit cut-off device 600A according to the second embodiment except that the insulator 560B is provided, and thus the description of the same configuration will be omitted.

Figure 13:
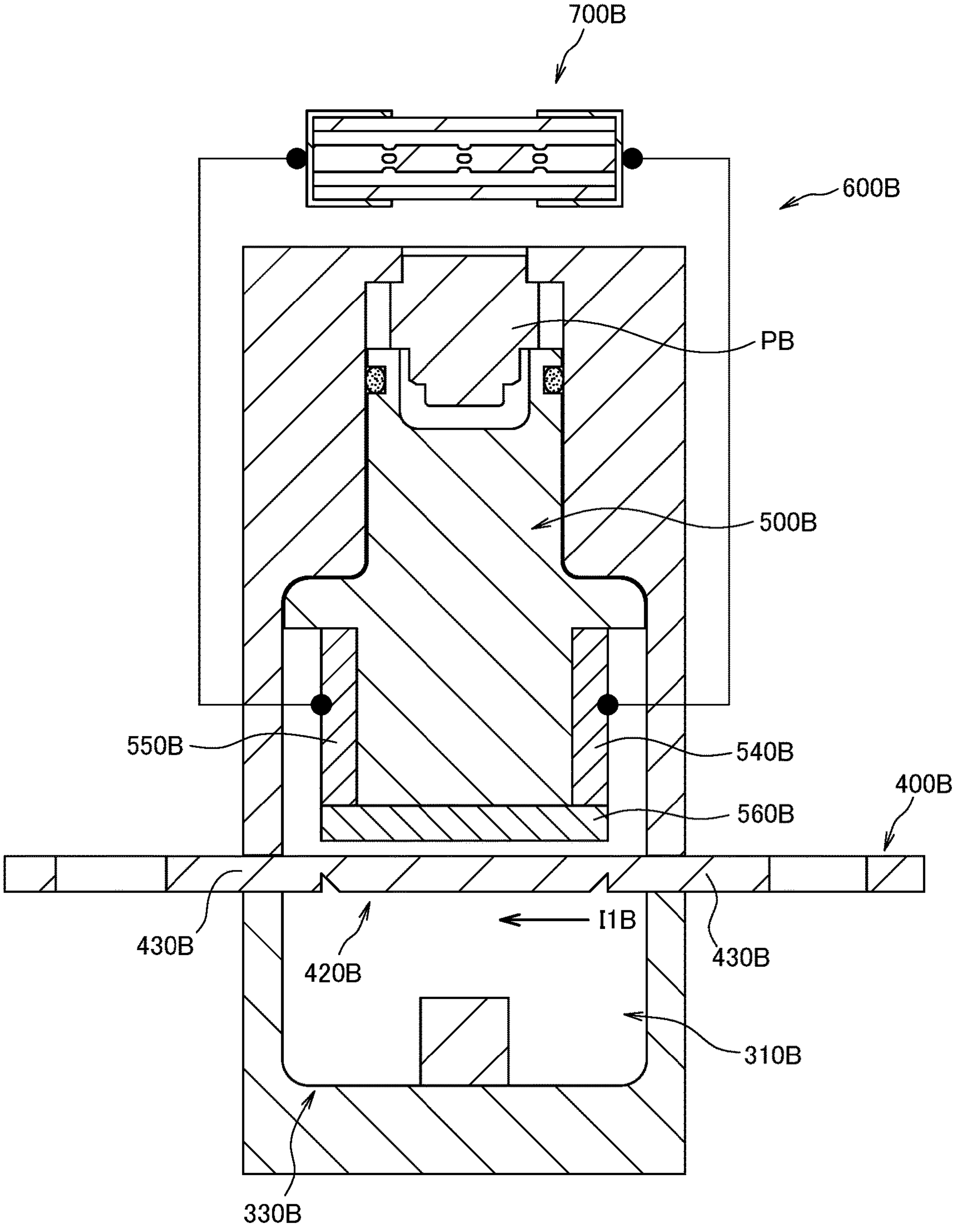
FIG. 13 is a cross-sectional view of an electric circuit cut-off device according to a third embodiment of the invention of the present application.

As illustrated in FIG. 13, an insulator 560B made of synthetic resin, ceramics, or the like is provided on the distal end side of the electrode part 540B and the electrode part 550B in the moving body 500B. The insulator 560B extends along the cut piece 420B and is disposed away from the cut piece 420B. At a normal time, since the base piece 430B and the cut piece 420B of the to-be-cut part 400B are not cut and are physically and electrically connected, the current I1B flows through the electric circuit through the base piece 430B and the cut piece 420B of the to-be-cut part 400B. The pair of electrode parts 540B and 550B are disposed on the lower end side of the moving body 500B so as to face the to-be-cut part 400B, and the insulator 560B separated from the to-be-cut part 400B is interposed between the pair of electrode parts and the to-be-cut part 400B. Therefore, since the pair of electrode parts 540B and 550B are not physically or electrically connected to the to-be-cut part 400B, the current flowing through the electric circuit does not flow to the fuse 700B through the electrode parts 540B and 550B.

Figure 14:
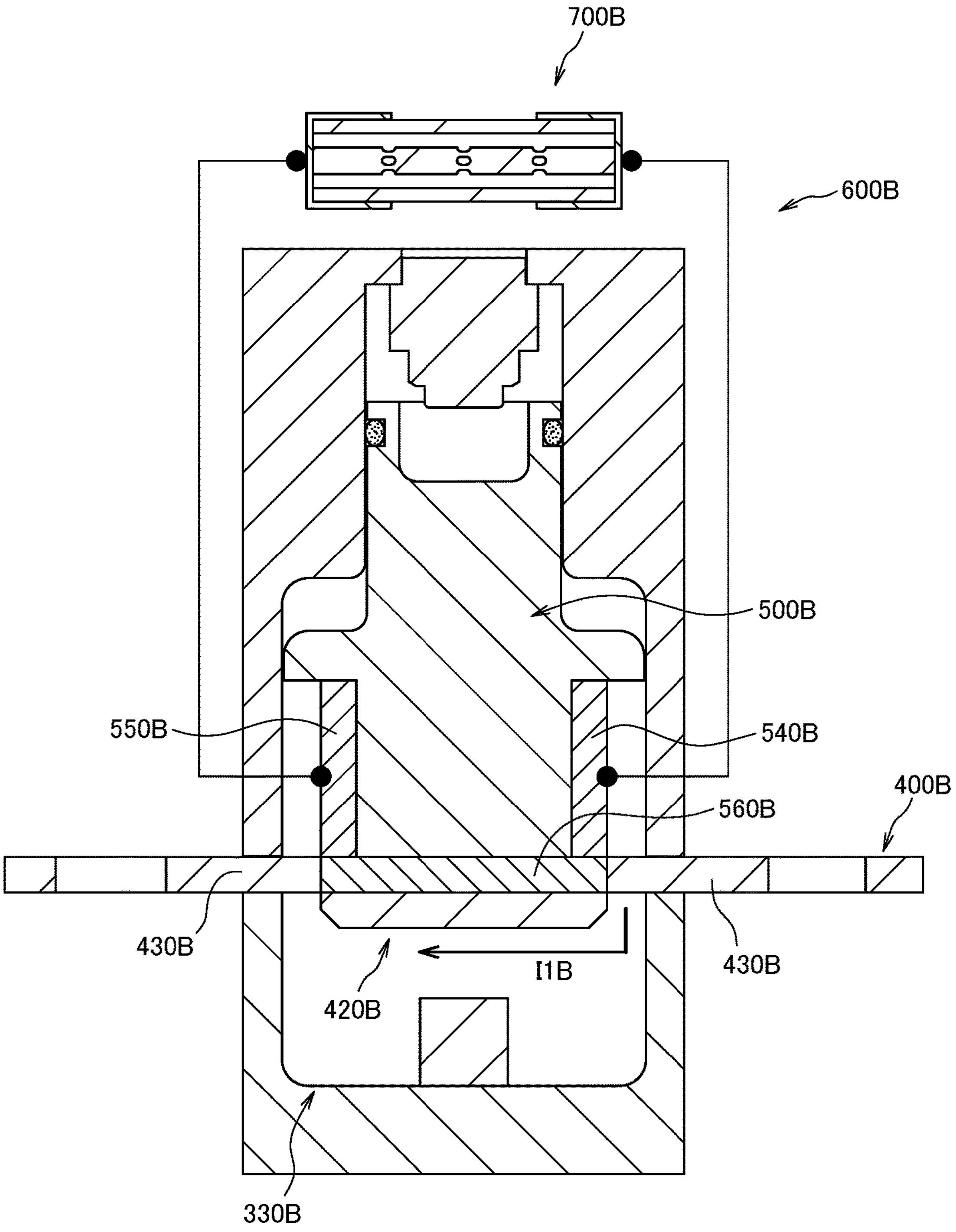
FIG. 14 is a cross-sectional view of the electric circuit cut-off device according to the third embodiment of the invention of the present application.

Next, when an abnormality such as overcurrent flowing to the electric circuit is detected, an abnormality signal is input to the power source PB, the gunpowder in the power source PB explodes, and the moving body 500B instantaneously moves toward the second end portion 330B through the accommodating portion 310B. Then, as illustrated in FIG. 14, the moving body 500B moves toward the second end portion 330B, the cut piece 420B is strongly pushed downward by the insulator 560B of the moving body 500B, and the cut piece 420B is cut near the coupling location of the cut piece 420B and the base piece 430B to be physically separated from the base piece 430B.

In this state, since the electrode part 540B and the electrode part 550B are not in contact with the base piece 430B, the current I1B flowing through the base piece 430B does not flow to the fuse 700B through the electrode part 540B and the electrode part 550B. However, the cut piece 420B immediately after being cut and separated is close in distance to the base piece 430B, and in this state, arc discharge is instantaneously generated between the cut piece 420B and the base piece 430B, and the current I1B can flow between the base pieces 430B on both sides through the cut piece 420B.

Figure 15:
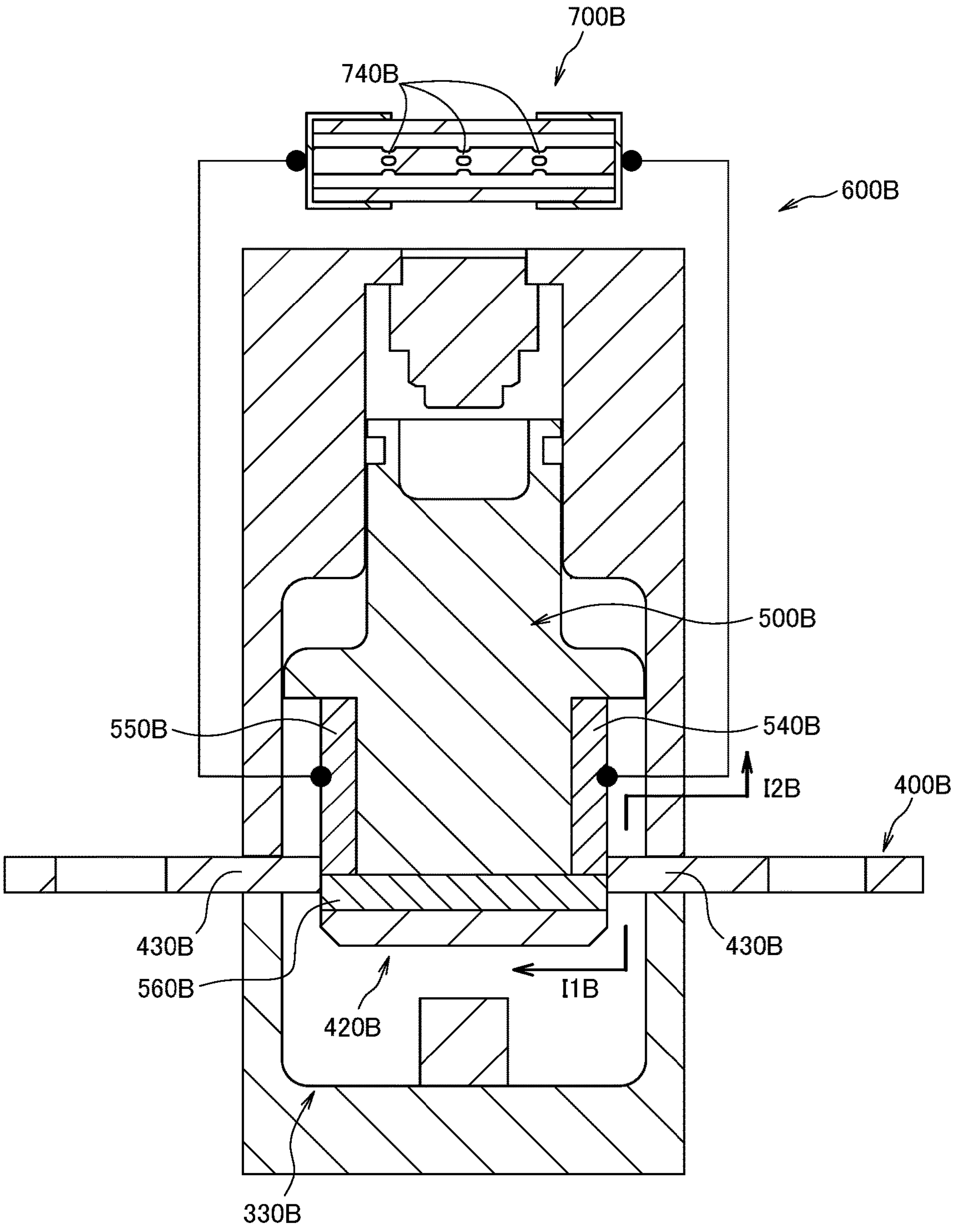
FIG. 15 is a cross-sectional view of the electric circuit cut-off device according to the third embodiment of the invention of the present application.

Next, as illustrated in FIG. 15, when the moving body 500B further moves toward the second end portion 330B, the electrode part 540B and the electrode part 550B come into contact with the base piece 430B in a state where the base piece 430B and the cut piece 420B remain energized by the arc discharge between the cut piece 420B and the base piece 430B. Then, the fuse 700B is energized with a part of the to-be-cut part 400B through the electrode part 540B and the electrode part 550B, and a part I2B of the current I1B flowing through the electric circuit flows to the fuse 700B.

Figure 16:
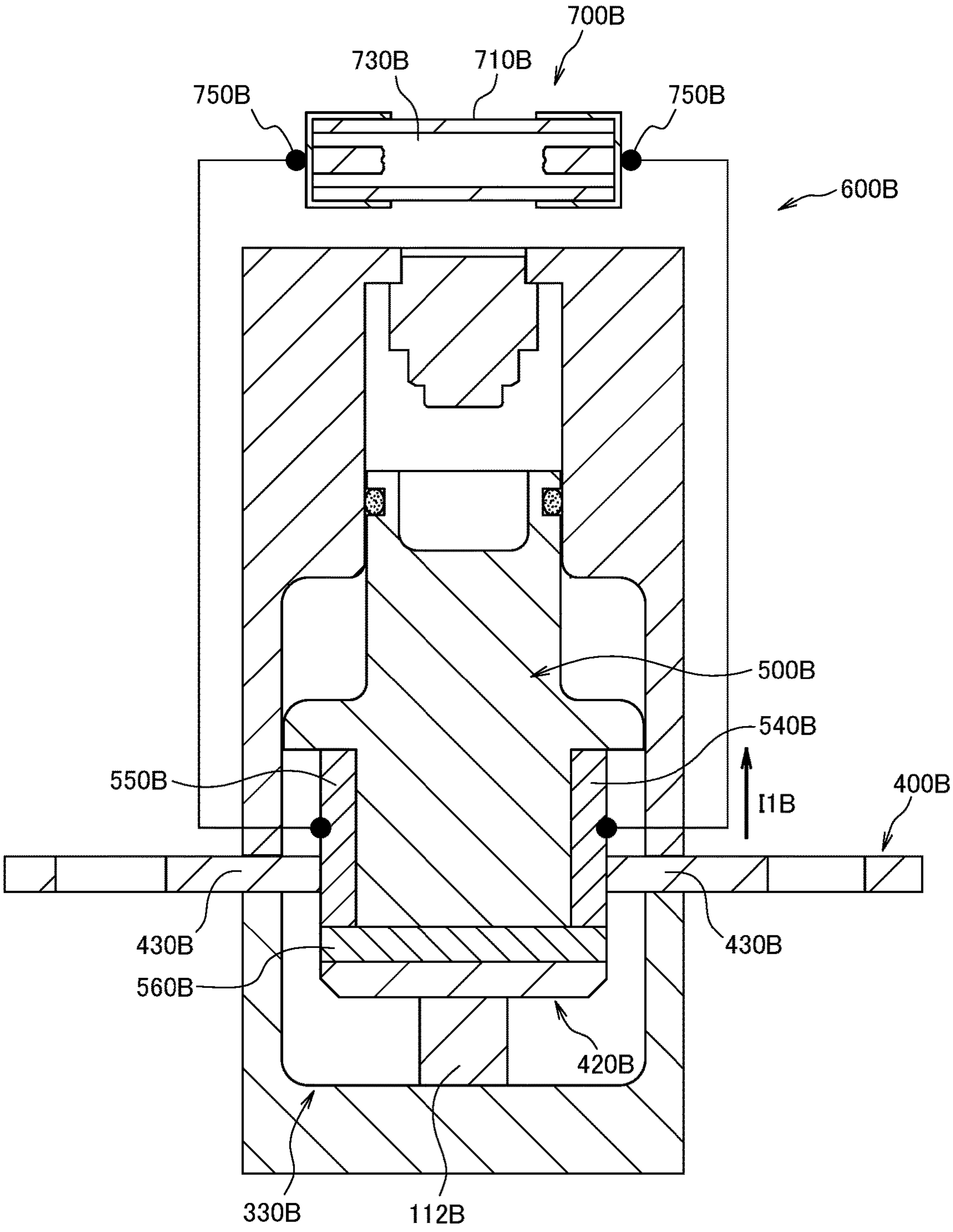
FIG. 16 is a cross-sectional view of the electric circuit cut-off device according to the third embodiment of the invention of the present application.

Next, as illustrated in FIG. 16, when the moving body 500B further moves toward the second end portion 330B, the cut piece 420B is pushed and moved toward the second end portion 330B and is greatly separated from the base piece 430B. Then, the arc discharge between the cut piece 420B and the base piece 430B is physically separated and extinguished. Therefore, the state in which the base pieces 430B on both sides of the to-be-cut part 400B are energized via the cut piece 420B by arc discharge is cut off, and an overcurrent can be prevented from flowing to the electric circuit.

As illustrated in FIG. 16, when the cut piece 420B is largely separated from the base piece 430B and the energized state of to-be-cut part 400B is cut off, the current I1B (fault current) flowing through the electric circuit is guided to the fuse 700B, so that it is possible to prevent continuous generation of arc discharge between the separated cut piece 420B and base piece 430B. As illustrated in FIGS. 14 to 15, in the arc discharge generated immediately after the cut piece 420B is separated from the base piece 430B, a part of the current I1B is guided to the fuse 700B, and thus energy is small and the arc discharge immediately extinguished. Therefore, even if the arc discharge is instantaneously generated immediately after the cut piece 420B is separated from the base piece 430B, the other components of the electric circuit cut-off device 600 are not affected, and there is no problem in safety.

As illustrated in FIG. 16, the current I1B guided to the fuse 700B quickly fuses the fusing portion 740B of the fuse 700B to quickly cut off the current flowing through the electric circuit. Furthermore, after the fusing portion 740B is fused, an arc is generated between the terminals 750B of the fuse 700B by the voltage applied to the base pieces 430B on both sides connected to the electric circuit, but the arc is quickly and effectively extinguished by the arc-extinguishing material 730B in the fuse 700B.

As described above, according to the electric circuit cut-off device 600B of the invention of the present application, the current (fault current) flowing to the electric circuit when the electric circuit is cut off is guided to the fuse 700B, and the arc generated by the guided current can be effectively and quickly extinguished in the fuse 700B. In particular, in the prior art, when the state in which the to-be-cut part 400B is energized is cut off, it is necessary to extinguish the arc spreading in a wide range generated between the cut piece 420B and the base piece 430B having a large cross-sectional area, and thus the amount of the arc-extinguishing material to be enclosed in the housing 300B increases, and there is a possibility that the size and weight of the electric circuit cut-off device 600B may increase. However, according to the electric circuit cut-off device 600B of the invention of the present application, the current (fault current) flowing when the electric circuit is cut off is guided to the fuse 700B, and immediately cut off by the fusing portion 740B, and thereafter, an arc can be generated in the narrow and limited casing 710B in the fuse 700B and can be quickly and effectively extinguished by the arc-extinguishing material 730B, and hence a large amount of arc-extinguishing material does not need to be used as in the conventional case, which contributes to miniaturization and weight reduction of the electric circuit cut-off device 600B.

In addition, when the electric circuit cut-off device 600B cuts off the electric circuit, as illustrated in FIGS. 14 to 16, the to-be-cut part 400B is connected to the fuse 700B through the pair of electrode parts 540B and 550B in a state where the base pieces 430B on both sides of the to-be-cut part 400B are energized by arc discharge through the cut piece 420B, and thereafter, as illustrated in FIG. 16, accompanying the movement of the moving body 500B, the cut piece 420B is largely separated from the base piece 430B to extinguish the arc discharge so that the arc discharge does not continue any longer, and the state in which the base pieces 430B on both sides of the to-be-cut part 400B are energized via the cut piece 420B is cut off. That is, the state in which the to-be-cut part 400B and the fuse 700B are connected is secured before the state in which the to-be-cut part 400B is energized is completely cut off, and the arc discharge is continuously generated between the base pieces 430B on both sides, so that the arc due to the fault current can be reliably guided to the fuse 700B and extinguished in the fuse 700B. As a result, it is possible to prevent the arc caused by the fault current from continuously occurring between the base pieces 430B in the housing 300B and damaging the electric circuit cut-off device 600B, and to safely cut off the electric circuit.

As illustrated in FIG. 16, when the moving body 500B further moves toward the second end portion 330B, the cut piece 420B pushed out by the moving body 500B abuts on the abutment base 112B, and the moving body 500B is stopped. Since the insulator 560B is disposed between the base piece 430B and the cut piece 420B, between the electrode part 540B and the cut piece 420B, and between the electrode part 550B and the cut piece 420B, even if a voltage is unexpectedly applied between the base pieces 430B, an arc is generated between the cut piece 420B and the base piece 430B, and the base pieces 430B on both sides can be prevented from being energized. As illustrated in FIGS. 15 to 16, after the pair of electrode parts 540B and 550B come into contact with a part of the to-be-cut part 400B, the electrode parts 540B and 550B always maintain a state of being in contact with a part of the to-be-cut part 400B while moving toward the second end portion 330B, so that a state in which the to-be-cut part 400B is connected to the fuse 700B is also always maintained.

Fourth Embodiment

Figure 17:
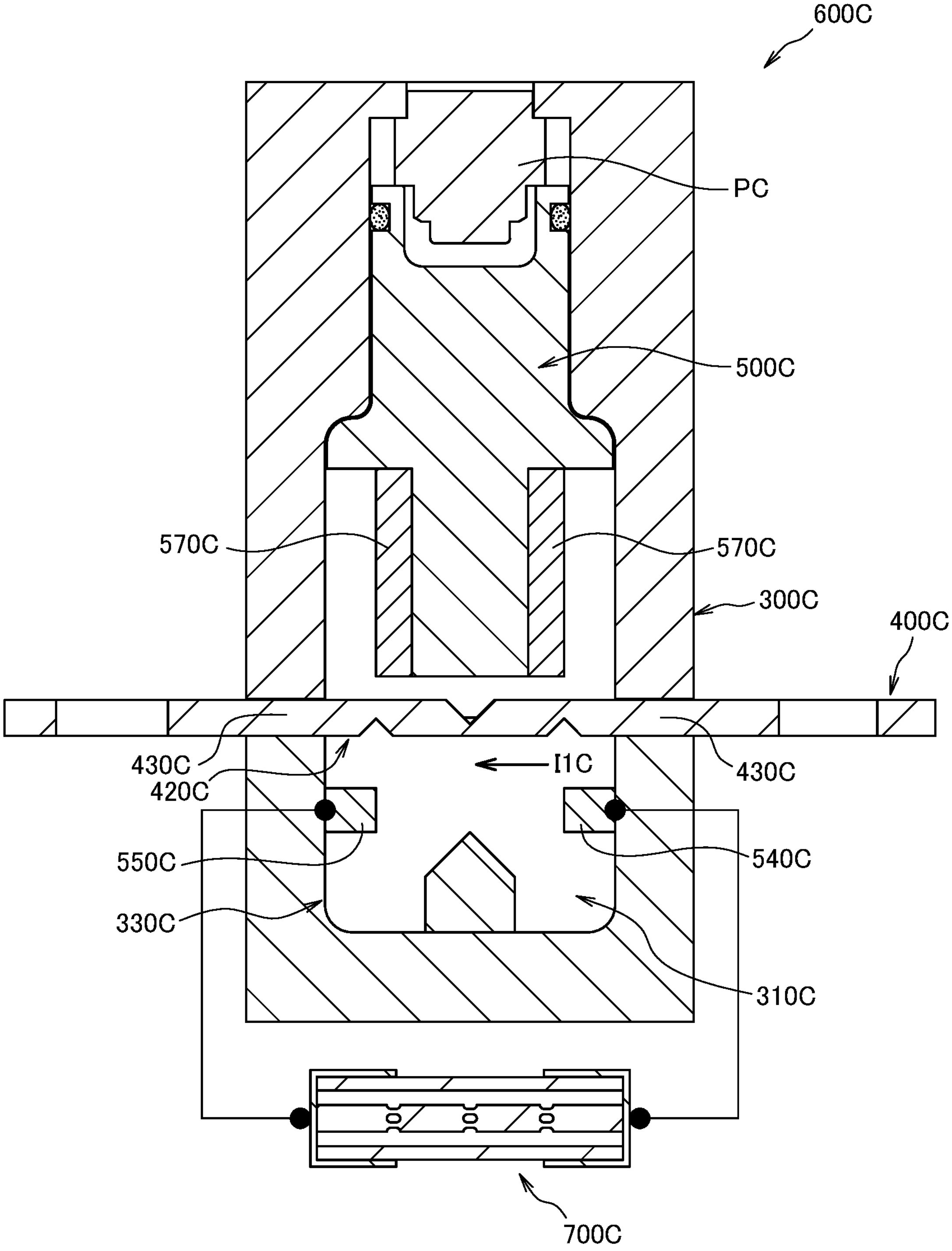
FIG. 17 is a cross-sectional view of an electric circuit cut-off device according to a fourth embodiment of the invention of the present application.

Next, an electric circuit cut-off device 600C of the invention of the present application according to a fourth embodiment will be described with reference to FIGS. 17 to Note that FIGS. 17 to 20 illustrate cross-sectional views of the electric circuit cut-off device 600C according to the fourth embodiment, similarly to the cross-sectional view of the electric circuit cut-off device 600 according to the first embodiment illustrated in FIG. 6. In addition, the configuration of the electric circuit cut-off device 600C according to the fourth embodiment is basically the same as the configuration of the electric circuit cut-off device 600 according to the first embodiment except that the arrangement of the electrode part 540C and the electrode part 550C and the conductor 570C are provided, and thus the description of the same configuration will be omitted.

As illustrated in FIG. 17, the electrode part 540A and the electrode part 550A are arranged on the second end portion 330C side in the accommodating portion 310C, and are located on the opposite side of the moving body 500C with the cut piece 420C in between. The fuse 700C is fixed at an arbitrary position of the housing 300C. In addition, a pair of conductors 570C made of metal such as copper is provided on the distal end side of the moving body 500C so as to face the cut piece 420C. At a normal time, since the base piece 430C and the cut piece 420C of the to-be-cut part 400C are not cut and are physically and electrically connected, the current I1C flows through the electric circuit through the base piece 430C and the cut piece 420C of the to-be-cut part 400C. Note that the pair of electrode parts 540C and 550C are disposed on the lower side of the cut piece 420C away from the cut piece 420C. Therefore, since the pair of electrode parts 540C and 550C are not physically or electrically connected to the to-be-cut part 400C, the current flowing through the electric circuit does not flow to the fuse 700C through the electrode parts 540C and 550C. In addition, the conductors 570C on both sides are physically separated from each other and are not electrically connected to each other. The conductor 570C is disposed on the upper side of the cut piece 420C away from the cut piece 420C.

Figure 18:
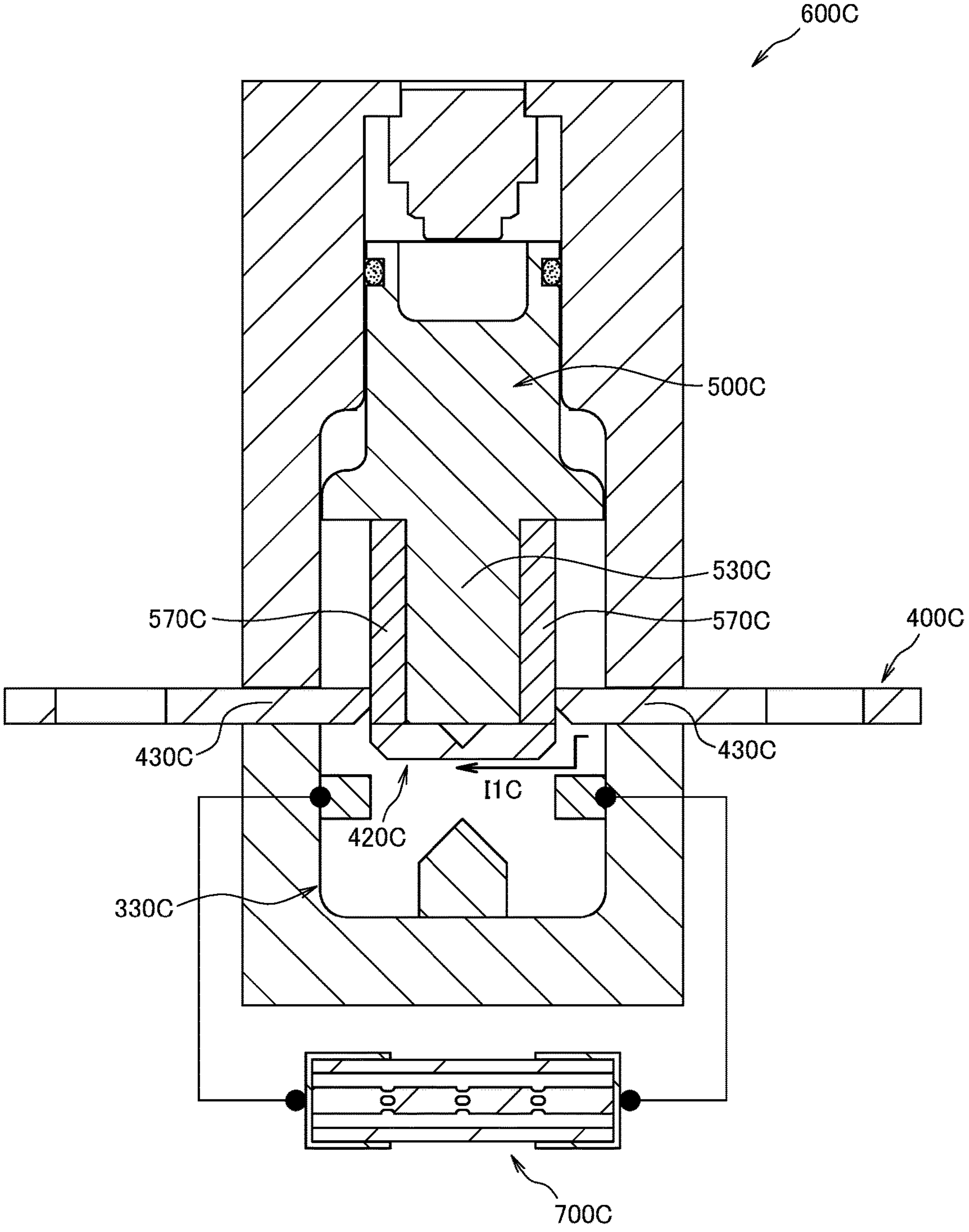
FIG. 18 is a cross-sectional view of The electric circuit cut-off device according to the fourth embodiment of the invention of the present application.

Next, when an abnormality such as overcurrent flowing to the electric circuit is detected, an abnormality signal is input to the power source PC, the gunpowder in the power source PC explodes, and the moving body 500C instantaneously moves toward the second end portion 330C through the accommodating portion 310C. Then, the pair of conductors 570C arranged on the lower end side of the moving body 500C come into contact with the cut piece 420C of the to-be-cut part 400C. Then, when the moving body 500C further moves toward the second end portion 330C, as illustrated in FIG. 18, the cut piece 420C is strongly pushed downward by the conductor 570C and the protruding portion 530C of the moving body 500C, and the cut piece 420C is cut in the vicinity of the coupling location of the cut piece 420C and the base piece 430C to be in a state of being physically separated from the base piece 430C. Since the conductor 570C is in contact with the cut piece 420C and the base piece 430C, the cut piece 420C is physically separated from the base piece 430C, but the base pieces 430C on both sides of the to-be-cut part 400C remain energized via the cut piece 420C by the conductor 570C.

Figure 19:
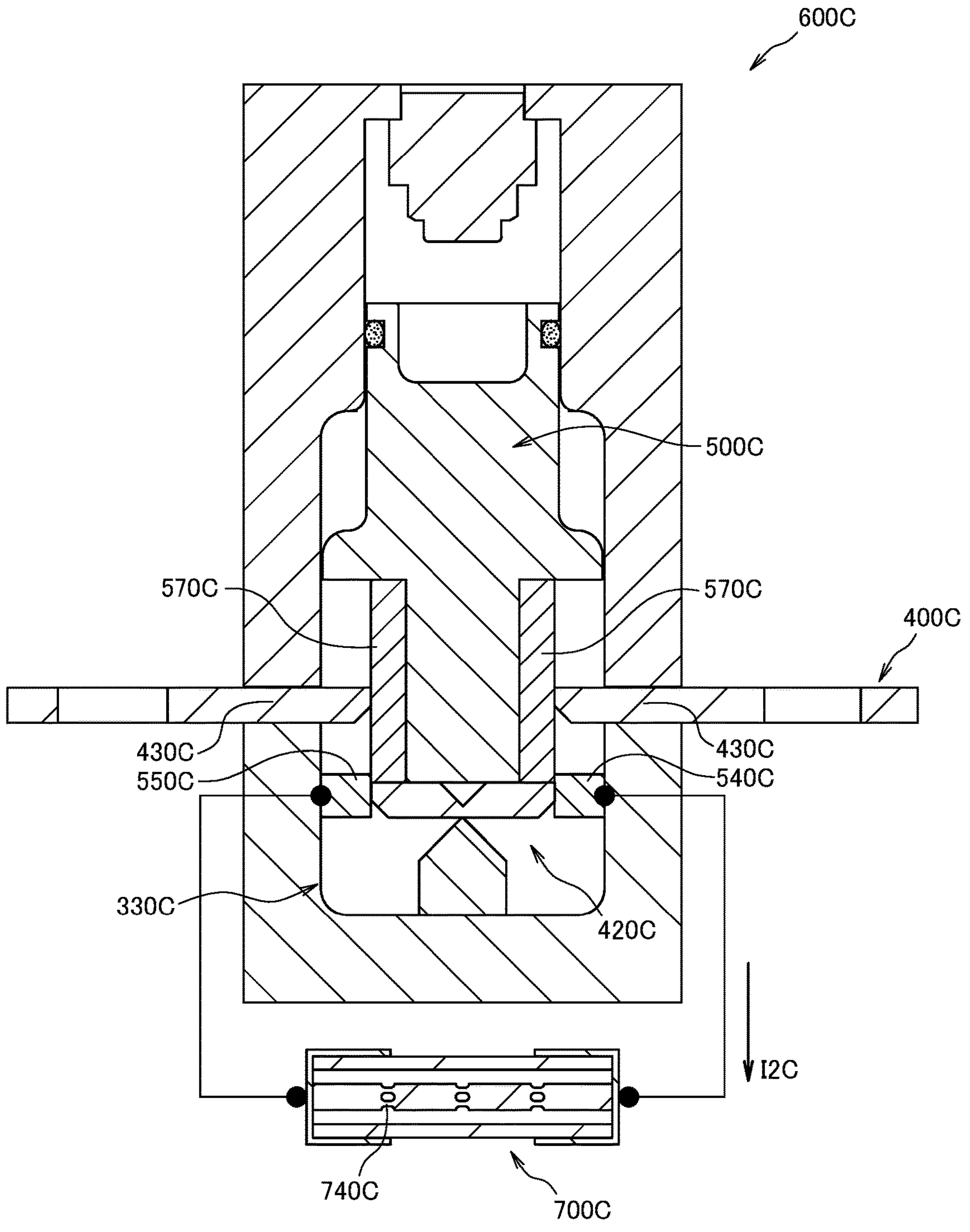
FIG. 19 is a cross-sectional view of the electric circuit cut-off device according to the fourth embodiment of the invention of the present application.

Furthermore, when the moving body 500C further moves toward the second end portion 330C, as illustrated in FIG. 19, the conductors 570C on both sides come into contact with the electrode part 540C and the electrode part 550C, respectively. The conductor 570C is also in contact with the base piece 430C. Therefore, the fuse 700C is in a state of being energized with a part of the to-be-cut part 400C via the conductor 570 C and the pair of electrode parts (540C, 550C), and a part of the current I2C flowing through the electric circuit flows to the fuse 700C. In the state illustrated in FIG. 19, since the cut piece 420C is in contact with the conductor 570C, the cut piece is electrically connected to the base piece 430C through the conductor 570C. That is, a part of the to-be-cut part 400C is connected to the fuse 700C while the base pieces 430C on both sides of the to-be-cut part 400C remain energized via the cut piece 420C.

Figure 20:
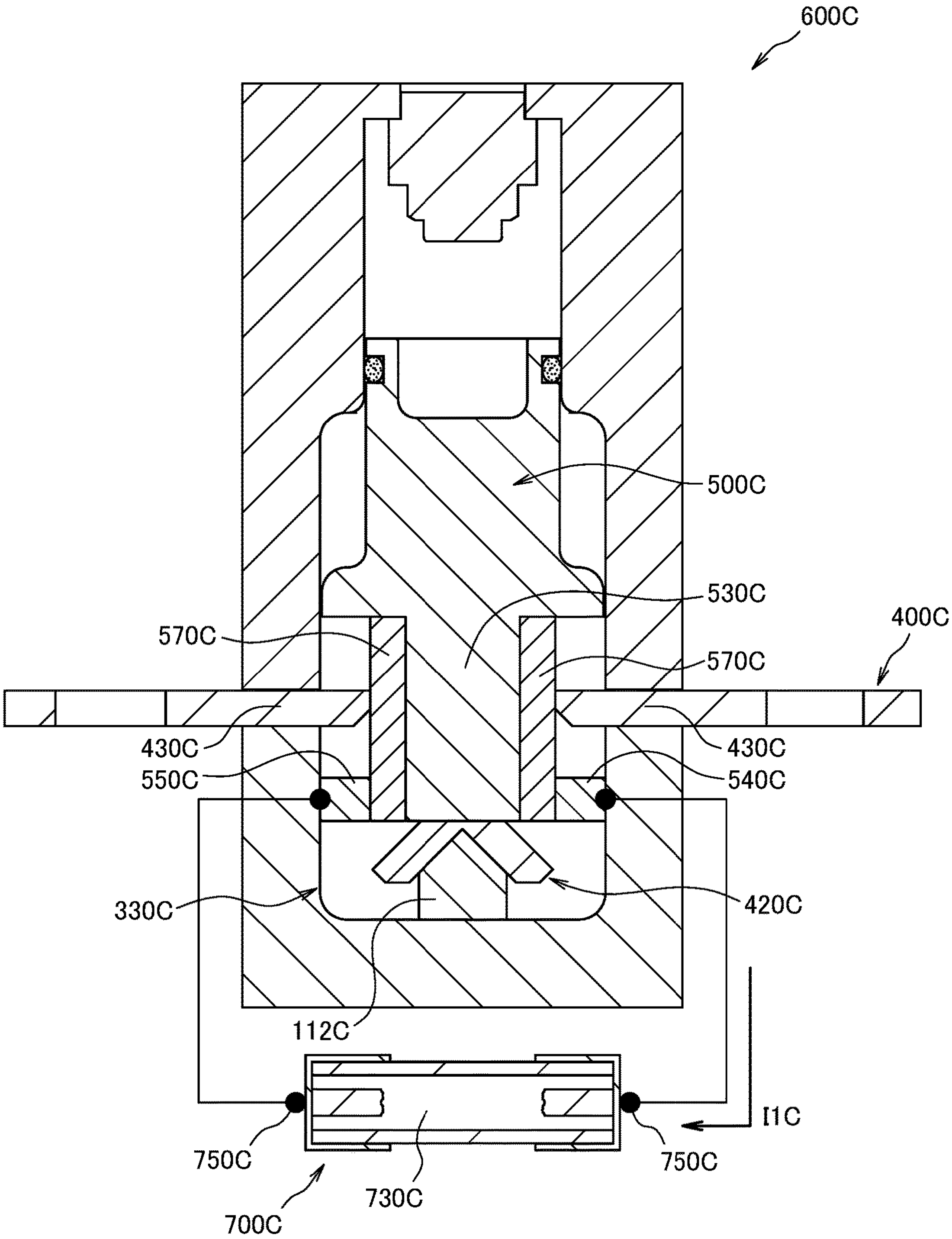
FIG. 20 is a cross-sectional view of the electric circuit cut-off device according to the fourth embodiment of the invention of the present application.

Next, as illustrated in FIG. 20, when the moving body 500C further moves toward the second end portion 330C, the cut piece 420C is strongly pushed downward by the protruding portion 530C and the conductor 570C of the moving body 500C, and the cut piece 420C is bent to a substantially dogleg-shape by the triangular distal end portion of the abutment base 112C. Therefore, the cut piece 420C and the conductor 570C are separated from each other, and the cut piece 420C and the conductor 570C are not physically or electrically connected to each other. That is, the state in which the base pieces 430C on both sides of the to-be-cut part 400C are energized via the cut pieces 420C is cut off, and an overcurrent can be prevented from flowing through the electric circuit.

In addition, as illustrated in FIGS. 19 to 20, after the pair of electrode parts 540C and 550C are brought into contact with a part of the to-be-cut part 400C through the conductor 570C and the to-be-cut part 400C is connected to the fuse 700C, the cut piece 420C of a part of the to-be-cut part 400C is bent, and the state in which the base pieces 430C on both sides of the to-be-cut part 400C are energized via the cut piece 420C is cut off, where when the state in which the to-be-cut part 400C is energized is cut off, the current I1C (fault current) flowing through the base piece 430C is guided to the fuse 700C. Therefore, an arc due to a fault current can be prevented from being generated between the divided cut piece 420C and the base piece 430C.

As illustrated in FIG. 20, the current I1C (fault current) guided to the fuse 700C quickly fuses the fusing portion 740C of the fuse 700C to quickly cut off the current flowing to the electric circuit. Furthermore, after the fusing portion 740C is fused, an arc is generated between the terminals 750C of the fuse 700C by the voltage applied to the base pieces 430C on both sides connected to the electric circuit, but the arc is quickly and effectively extinguished by the arc-extinguishing material 730C in the fuse 700C. As shown in FIGS. 19 to 20, after the pair of conductors 570C come into contact with a part of the to-be-cut part 400C and the pair of electrode parts (540C, 550C), the conductor 570C always maintains a state in which a part of the to-be-cut part 400C and the pair of electrode parts (540C, 550C) are in contact while moving toward the second end portion 330C, and thus a state in which the to-be-cut part 400C is connected to the fuse 700C is also always maintained.

As described above, according to the electric circuit cut-off device 600C of the invention of the present application, the current (fault current) flowing to the electric circuit when the electric circuit is cut off is guided to the fuse 700C, and the arc generated by the guided current can be effectively and quickly extinguished in the fuse 700C. In addition, since a state in which the to-be-cut part 400C and the fuse 700C are connected is secured before the state in which the to-be-cut part 400C is energized is cut off and an arc is generated between the base pieces 430C on both sides, the arc due to the fault current can be reliably guided to the fuse 700C and extinguished in the fuse 700C. As a result, it is possible to prevent the electric circuit cut-off device 600C from being damaged by generation of an arc between the base pieces 430C in the housing 300C, and to safely cut off the electric circuit.

In addition, by providing the pair of electrode parts (540C, 550C) and the fuse 700C not on the moving body 500C side but on the housing 300C side, a state in which the connectivity of the pair of electrode parts (540C, 550C) and the fuse 700C is stably and reliably connected without being affected by the movement of the moving body 500C can be easily maintained. Therefore, the connection configuration (connection member etc.) of the pair of electrode parts (540C, 550C) and the fuse 700C can be simplified without considering the movement of moving body 500C.

Fifth Embodiment

Figure 21:
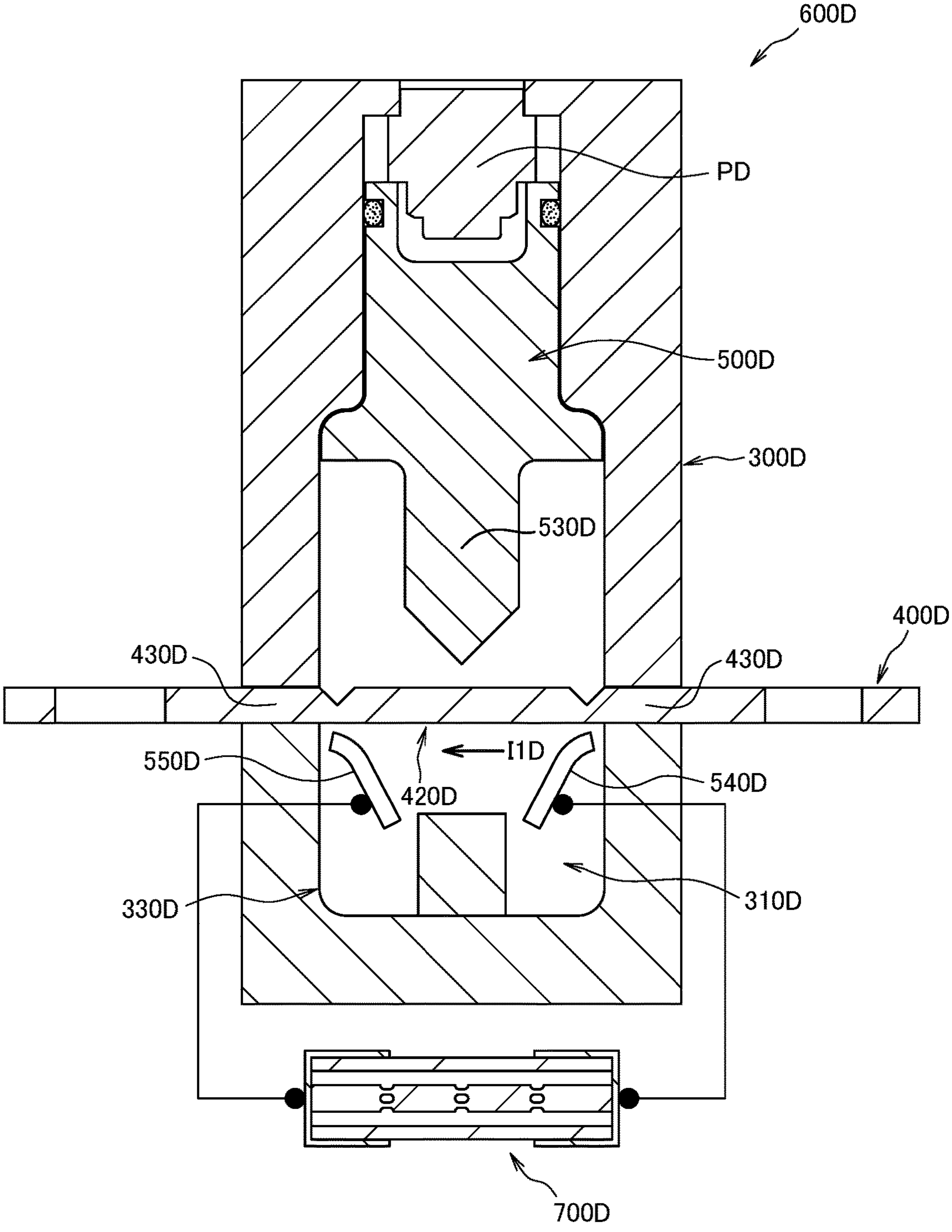
FIG. 21 is a cross-sectional view of an electric circuit cut-off device according to a fifth embodiment of the invention of the present application.
Figure 22:
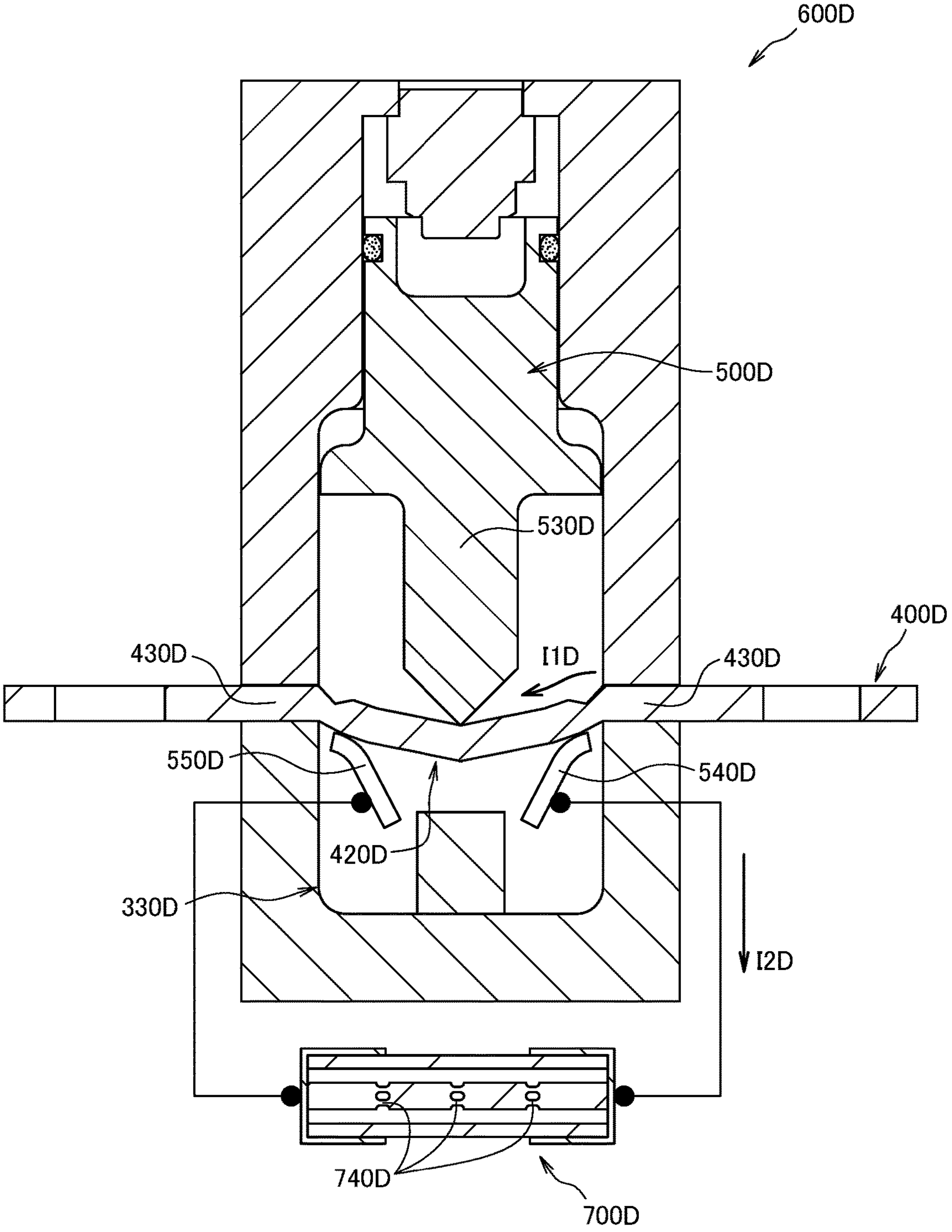
FIG. 22 is a cross-sectional view of The electric circuit cut-off device according to the fifth embodiment of the invention of the present application.
Figure 23:
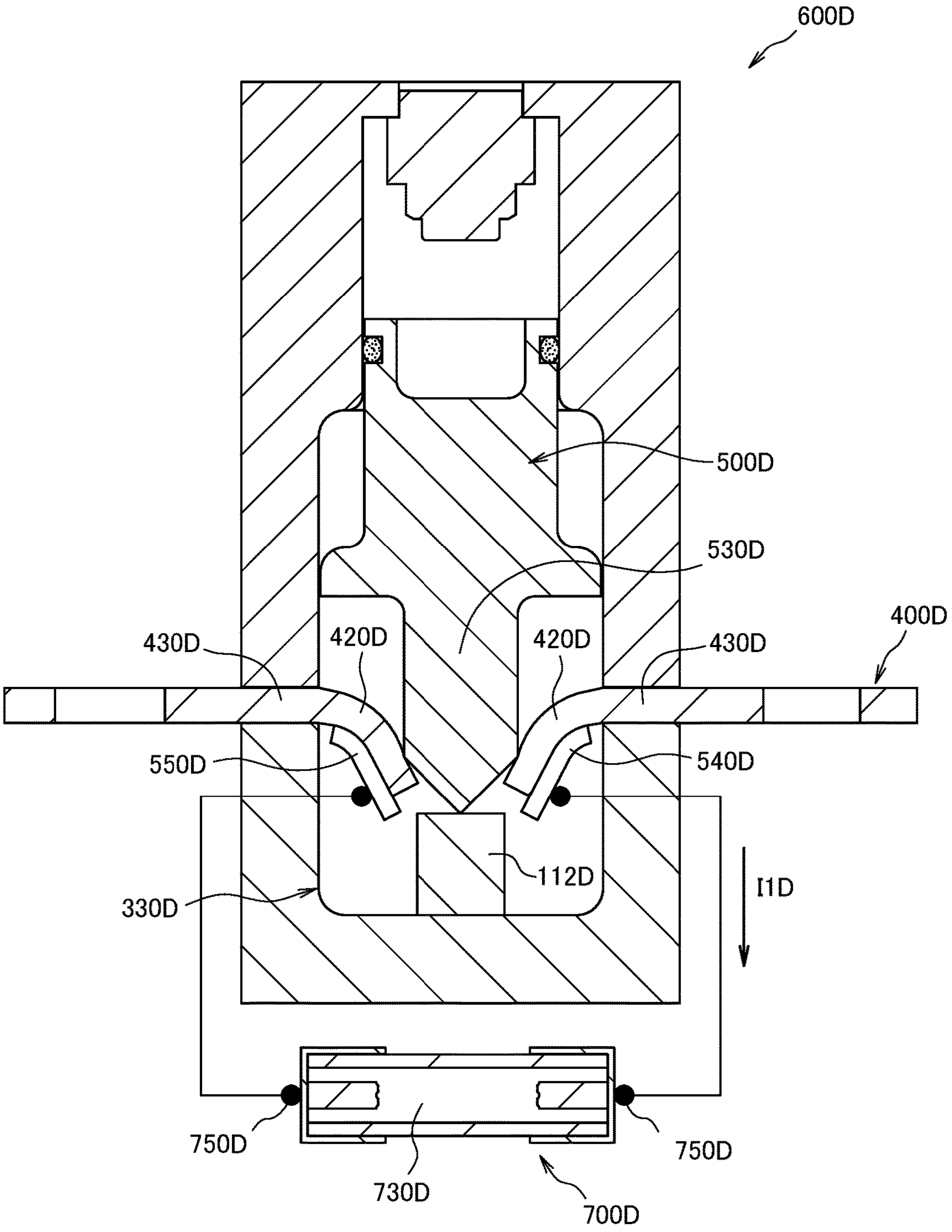
FIG. 23 is a cross-sectional view of the electric circuit cut-off device according to the fifth embodiment of the invention of the present application.

Next, an electric circuit cut-off device 600D of the invention of the present application according to a fifth embodiment will be described with reference to FIGS. 21 to 23. Note that FIGS. 21 to 23 illustrate cross-sectional views of the electric circuit cut-off device 600D according to the fifth embodiment, similarly to the cross-sectional view of the electric circuit cut-off device 600 according to the first embodiment illustrated in FIG. 6. In addition, since the configuration of the electric circuit cut-off device 600D according to the fifth embodiment is basically the same as the configuration of the electric circuit cut-off device 600 according to the first embodiment except for the arrangement of the electrode part 540D and the electrode part 550D, the description of the same configuration will be omitted.

As illustrated in FIG. 21, the electrode part 540D and the electrode part 550D are not provided in the moving body 500D, are arranged on the second end portion 330D side in the accommodating portion 310D, and are located on the opposite side of the moving body 500D with the cut piece 420D in between. The fuse 700D is fixed at an arbitrary position of the housing 300D. At the normal time, since the base piece 430D and the cut piece 420D of the to-be-cut part 400D are not cut, and are physically and electrically connected, the current HD flows through the electric circuit through the base piece 430D and the cut piece 420D of the to-be-cut part 400D. Note that the pair of electrode parts 540D and 550D are disposed on the lower side of the cut piece 420D away from the cut piece 420D. Therefore, since the pair of electrode parts 540D and 550D are not physically or electrically connected to the to-be-cut part 400D, the current flowing through the electric circuit does not flow to the fuse 700D through the electrode parts 540D and 550D.

Next, when an abnormality such as overcurrent flowing to the electric circuit is detected, an abnormality signal is input to the power source PD, the gunpowder in the power source PD explodes, and the moving body 500D instantaneously moves toward the second end portion 330D through the accommodating portion 310D. Then, as illustrated in FIG. 22, since the protruding portion 530D arranged on the lower end side of the moving body 500D pushes the vicinity of substantially the center of the cut piece 420D downward, the substantially center of the cut piece 420 D bends downward. Then, the cut piece 420D bent downward comes into contact with the electrode part 540D and the electrode part 550D. Although the cut piece 420D is deformed so as to bend downward, the cut piece 420D is physically and electrically connected to the base pieces 430D on both sides, and thus the current I1D flows between the base pieces 430D on both sides through the cut piece 420D.

Then, the fuse 700D is in a state of being energized with a part of the to-be-cut part 400D through the electrode part 540D and the electrode part 550D, and a part I2D of the current I1D flowing through the electric circuit flows to the fuse 700D. Furthermore, in the state illustrated in FIG. 22, a part of the to-be-cut part 400D is connected to the fuse 700D in a state where the base pieces 430D on both sides of the to-be-cut part 400D remain energized via the cut piece 420D.

Next, as illustrated in FIG. 23, when the moving body 500D further moves toward the second end portion 330D, the cut piece 420D is strongly pushed downward by the protruding portion 530D of the moving body 500D and cut at substantially the center. Therefore, the base pieces 430D continuous with the cut pieces 420D on both divided sides are not physically or electrically connected to each other. That is, the state in which the base pieces 430D on both sides of the to-be-cut part 400D are energized via the cut pieces 420D is cut off, and an overcurrent can be prevented from flowing to the electric circuit.

In addition, as illustrated in FIGS. 22 to 23, after the pair of electrode parts 540D and 550D come into contact with the cut piece 420D deformed to be bent and the to-be-cut part 400D is connected to the fuse 700D, the cut piece 420D is divided, and the state in which the base pieces 430D on both sides of the to-be-cut part 400D are energized via the cut piece 420D is cut off, and thus when the state in which the to-be-cut part 400 D is energized is cut off, the current I1D (fault current) flowing through the base piece 430D is guided to the fuse 700D. Therefore, it is possible to prevent generation of an arc due to a fault current between the base pieces 430D on both sides.

As illustrated in FIG. 23, current I1D (fault current) guided to the fuse 700D quickly fuses the fusing portion 740D of fuse 700D and quickly cuts off the current flowing to the electric circuit. Furthermore, after the fusing portion 740D is fused, an arc is generated between the terminals 750D of the fuse 700D by the voltage applied to the base pieces 430D on both sides connected to the electric circuit, but the arc is quickly and effectively extinguished by the arc-extinguishing material 730D in the fuse 700D. As illustrated in FIGS. 22 to 23, after the cut piece 420D comes into contact with the pair of electrode parts (540D, 550D), even when the moving body 500D moves, a state in which the cut piece 420D is in contact with the pair of electrode parts (540D, 550D) is always maintained, so that a state in which the to-be-cut part 400D is connected to fuse the 700D is also always maintained.

As described above, according to the electric circuit cut-off device 600D of the invention of the present application, the current (fault current) flowing to the electric circuit when the electric circuit is cut off is guided to the fuse 700D, and the arc generated by the guided current can be effectively and quickly extinguished in the fuse 700D. In addition, since a state in which the to-be-cut part 400D and the fuse 700D are connected is secured before the state in which the to-be-cut part 400D is energized is cut off and an arc is generated between the base pieces 430D on both sides, the arc due to the fault current can be reliably guided to the fuse 700D and extinguished in the fuse 700D. As a result, it is possible to prevent the electric circuit cut-off device 600D from being damaged by generation of an arc between the base pieces 430D in the housing 300D, and to safely cut off the electric circuit.

In FIG. 23, the protruding portion 530D at the lower end of moving body 500D abuts on the abutment base 112D, and the moving body 500D is stopped. Since the protruding portion 530D and the abutment base 112 D are located between the cut pieces 420D on both divided sides, even if a voltage is unexpectedly applied between the base pieces 430D, an arc is generated between the base pieces 430D, and the cut pieces 420D on both sides can be prevented from being energized.

Sixth Embodiment

Figure 24:
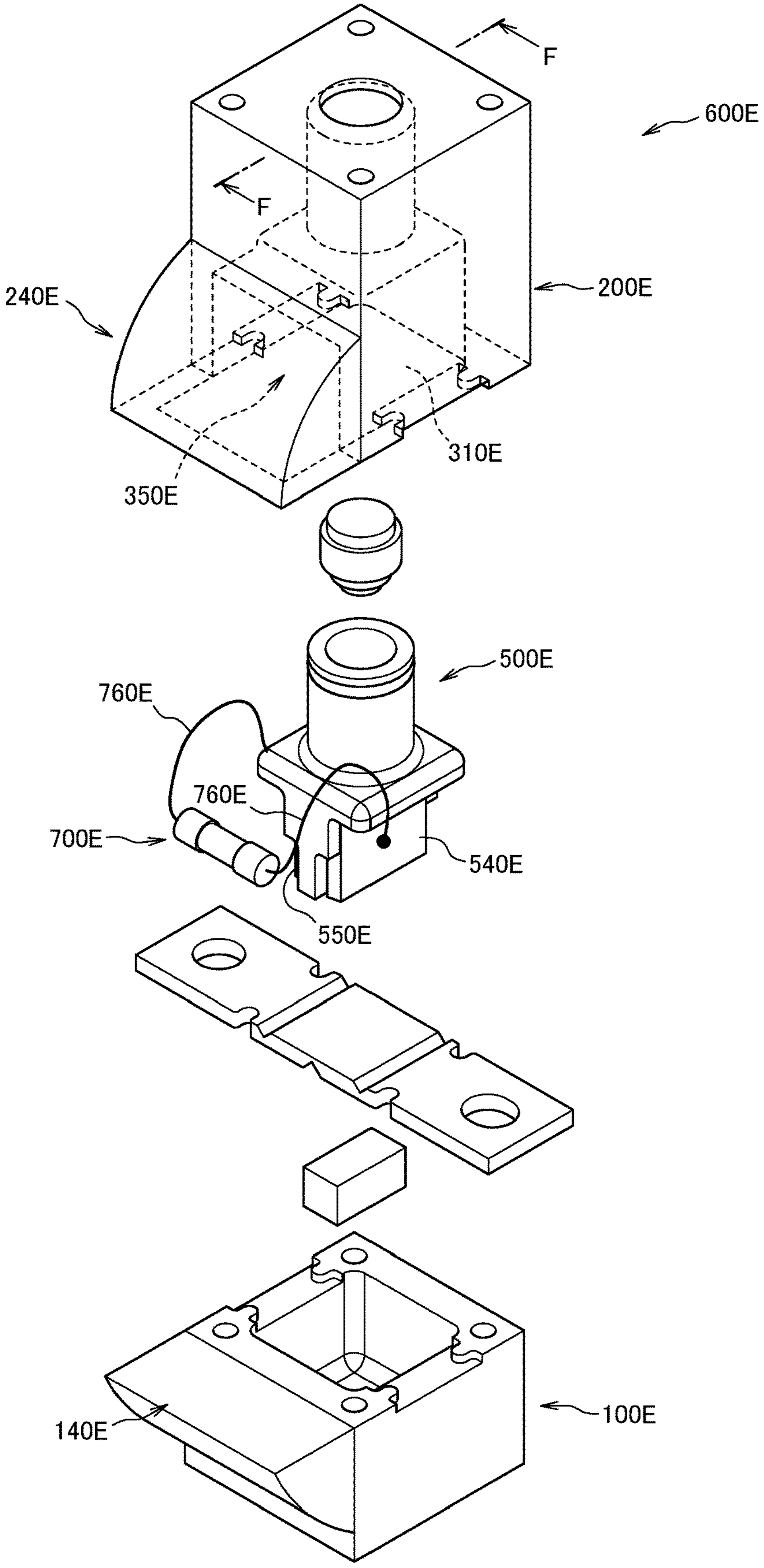
FIG. 24 is an exploded perspective view of an electric circuit cut-off device according to a sixth embodiment of the invention of the present application.

Next, an electric circuit cut-off device 600E of the invention of the present application according to a sixth embodiment will be described with reference to FIG. 24 and FIG. 24 is an exploded perspective view of the electric circuit cut-off device 600E according to the sixth embodiment, FIG. 25(*a*) is a cross-sectional view taken along line F-F illustrated in FIG. 24, and FIG. 25(*b*) is a cross-sectional view taken along line F-F in a state where the moving body 500E has moved toward the second end portion 330E from the state illustrated in FIG. 25(*a*). In addition, since the configuration of the electric circuit cut-off device 600E according to the sixth embodiment is basically the same as the configuration of the electric circuit cut-off device 600 according to the first embodiment except for the configuration of the housing 300E, the description of the same configuration will be omitted. When the pair of electrode parts (540E, 550E) are provided on the moving body 500E and the fuse 700E is provided on the housing 300E side as in the electric circuit cut-off device 600E according to the sixth embodiment, the connection configuration (connection member etc.) of the pair of electrode parts (540E, 550E) and the fuse 700E is configured in consideration of the movement of the moving body 500E so that the pair of electrode parts (540E, 550E) and the fuse 700E can be stably and reliably connected even if the moving body 500E moves. The same applies to the electric circuit cut-off devices of the invention of the present application according to the seventh and eighth embodiments.

As illustrated in FIG. 24, the lower housing 100E of the housing 300E includes an accommodating portion 140E for accommodating the fuse 700E. The upper housing 200E of the housing 300E also includes an accommodating portion 240E for accommodating the fuse 700E. As illustrated in FIGS. 24 and 25, the fuse 700E is accommodated in a part of the housing 300E by the accommodating portion 140E and the accommodating portion 240E. In addition, an opening 350E communicating with the accommodating portion 310E is provided in a part of the housing 300E, and the connection member 760E connected to the fuse 700E is attached to the electrode part 540E and the electrode part 550E of the moving body 500E through the opening 350E.

Figure 25A:
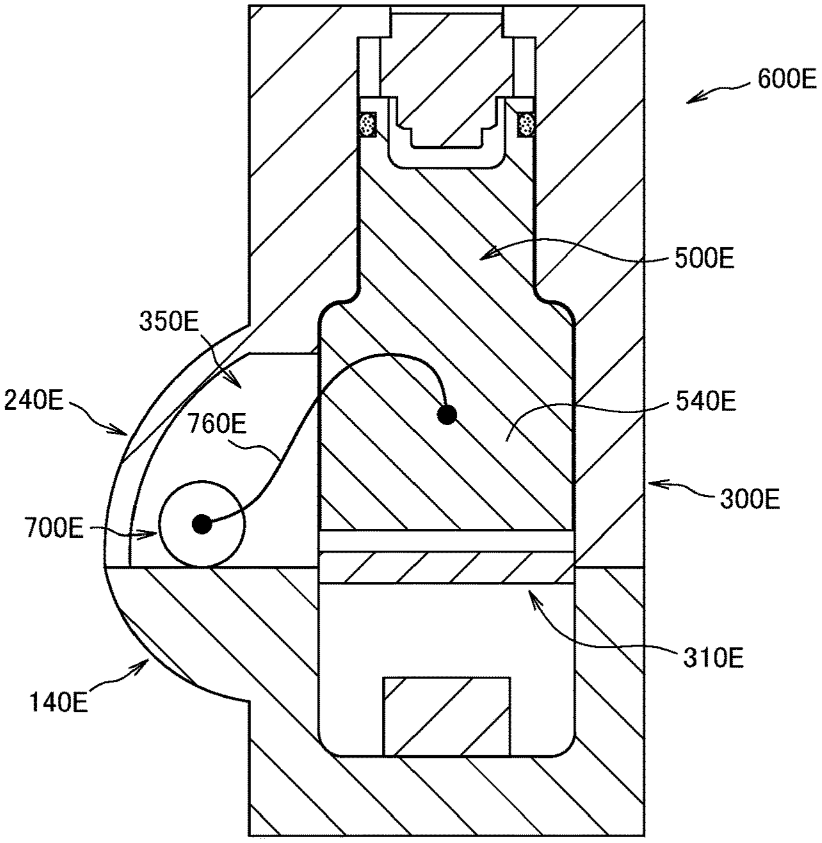
FIG. 25(*a*) is a cross-sectional view taken along line F-F illustrated in FIG. 24, and FIG. 25(*b*) is a cross-sectional view taken along line F-F in a state where the moving body has moved toward the second end portion from the state illustrated in FIG. 25(*a*).
Figure 25B:
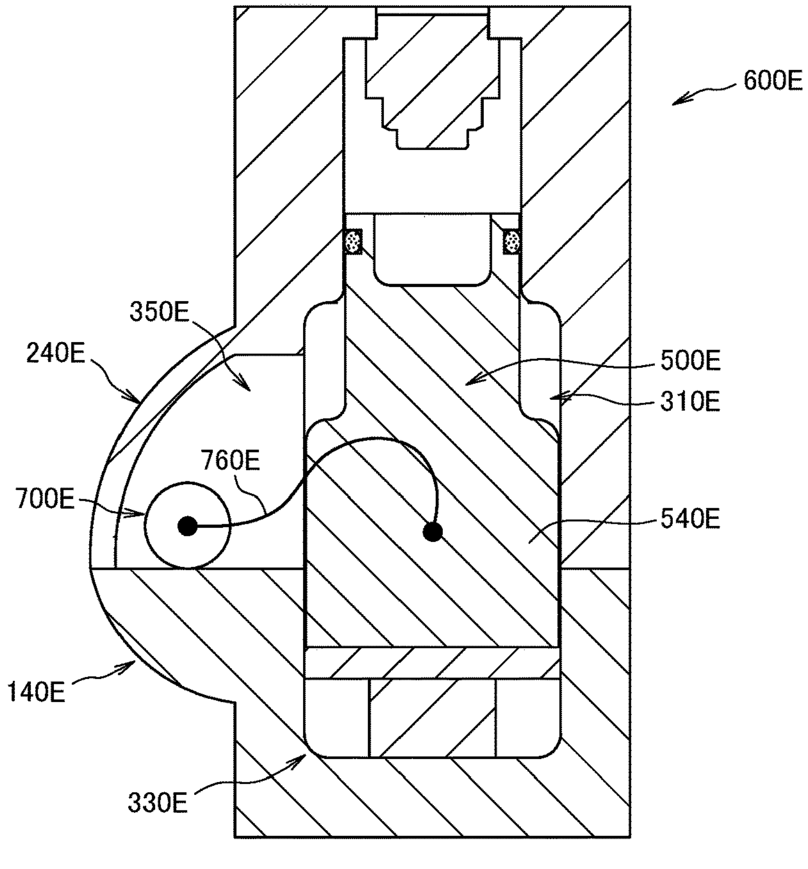

The connection member 760E is formed of an electric wire, and the length of the connection member 760E is longer than the movement amount by which the electric circuit cut-off device 600E is operated to move the moving body 500E toward the second end portion 330E (i.e., linear distance in the moving direction of the moving body 500E before the movement of FIG. 25(*a*) and the moving body 500E stopped after the movement). Therefore, even if the connection member 760E is pulled to the second end portion 330E accompanying the movement of the moving body 500E, a load (tension etc.) due to the movement is not applied to the connection member 760E, a state in which the connection member 760E is connected to the fuse 700E and the pair of electrode parts (540E, 550E) is maintained, and the current in the electric circuit is stably supplied from the pair of electrode parts 540E and 550E to the fuse 700E.

Note that the connection member 760E is not limited to the configuration illustrated in FIGS. 24 to 25, and any configuration such as an electric wire that is elastically deformed in a stretchable manner, for example, can be adopted as long as the connection member 760E can freely move and deform so that a load (tension etc.) due to the movement of the moving body 500E is not applied.

Seventh Embodiment

Figure 26:
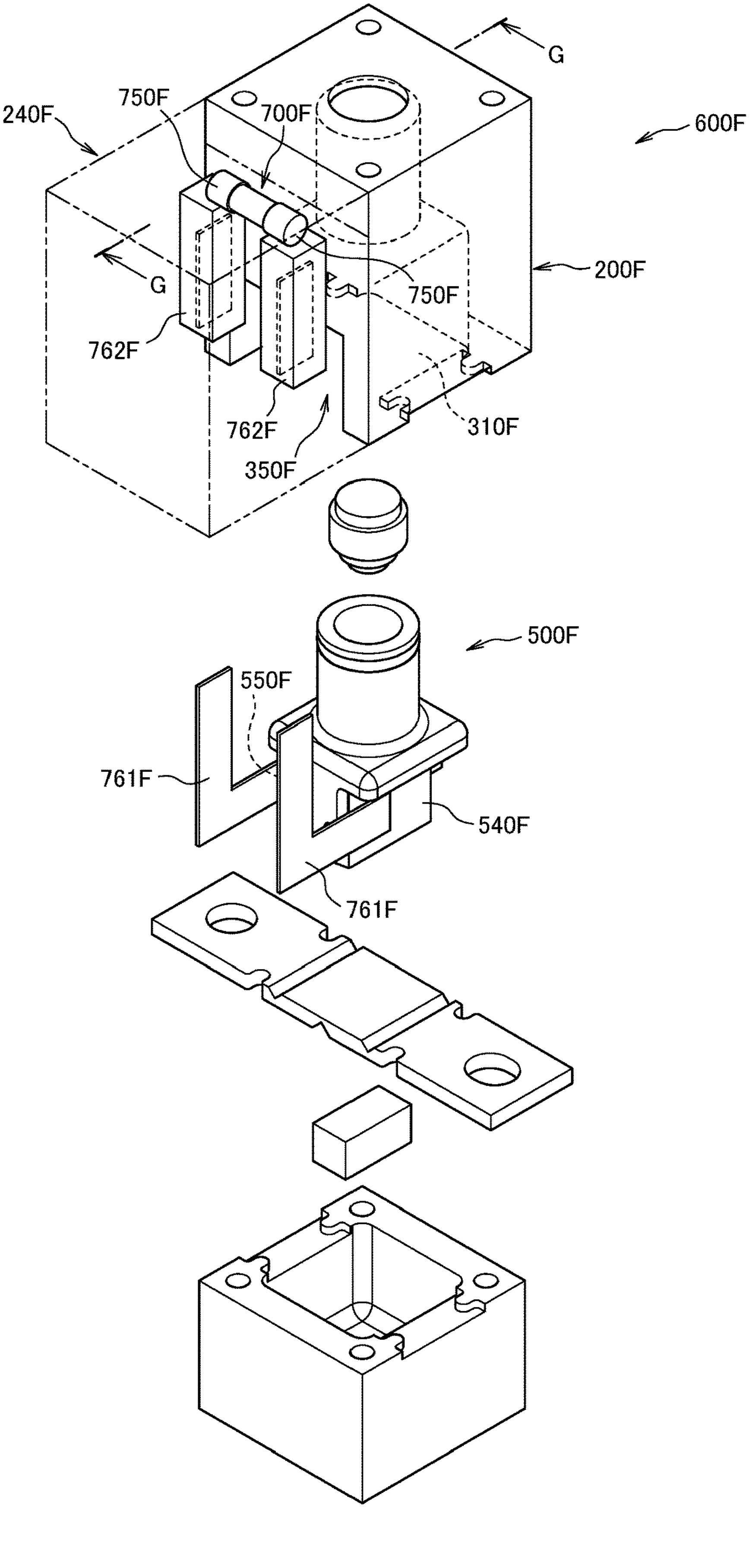
FIG. 26 is an exploded perspective view of an electric circuit cut-off device according to a seventh embodiment of the invention of the present application.

Next, an electric circuit cut-off device 600F of the invention of the present application according to a seventh embodiment will be described with reference to FIGS. 26 and 27. FIG. 26 is an exploded perspective view of the electric circuit cut-off device 600F according to the seventh embodiment, FIG. 27(*a*) is a cross-sectional view taken along line G-G illustrated in FIG. 26, and FIG. 27(*b*) is a cross-sectional view taken along line G-G in a state where the moving body 500F has moved toward the second end portion 330F from the state illustrated in FIG. 27(*a*). In addition, the configuration of the electric circuit cut-off device 600F according to the seventh embodiment is basically the same as the configuration of the electric circuit cut-off device 600 according to the first embodiment except for the configuration of the housing 300F and the configuration of the connection member 760F, and thus the description of the same configuration will be omitted.

As illustrated in FIG. 26, the upper housing 200F of the housing 300F includes an accommodating portion 240F for accommodating the fuse 700F. As illustrated in FIGS. 26 and 27, the fuse 700F is accommodated in a part of the housing 300F by the accommodating portion 240F. In addition, an opening 350F communicating with the accommodating portion 310F is provided in a part of the housing 300F, and the connection member 760F connected to the fuse 700F is attached to the electrode part 540F and the electrode part 550F of the moving body 500F through the opening 350F.

Figure 27A:
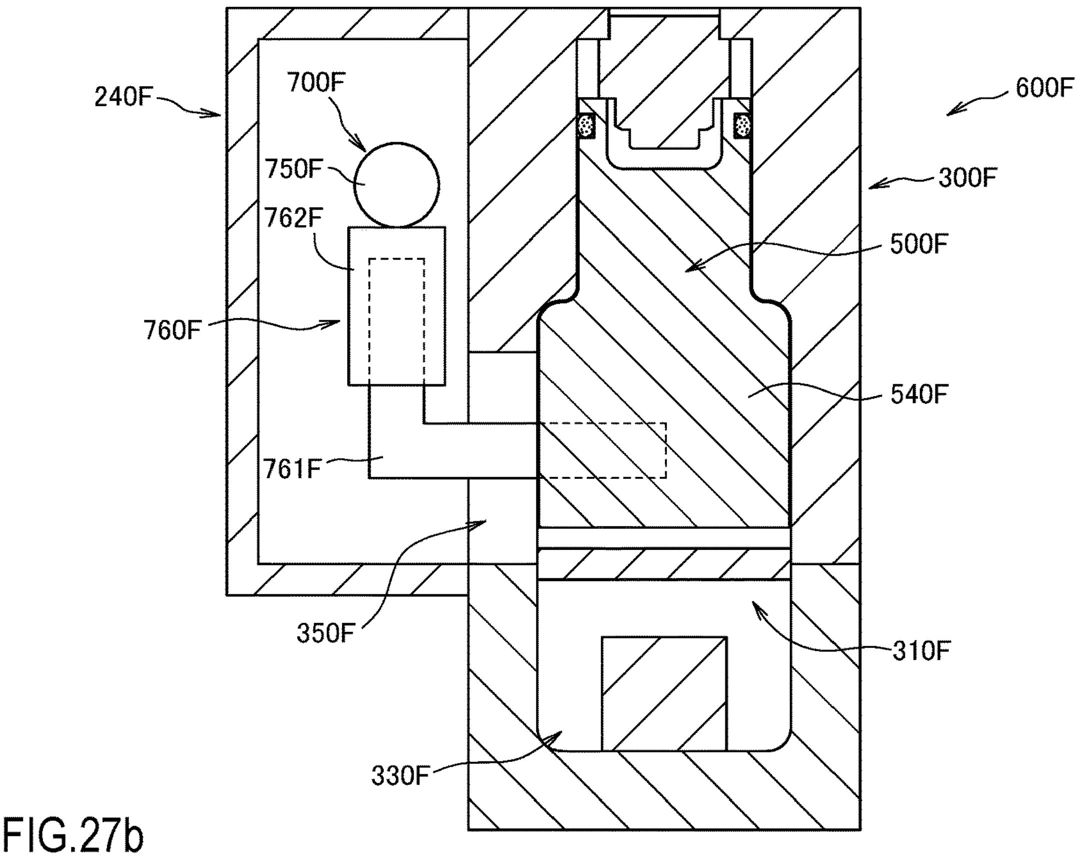
FIG. 27(*a*) is a cross-sectional view taken along line G-G illustrated in FIG. 26, and FIG. 27(*b*) is a cross-sectional view taken along line G-G in a state where the moving body has moved toward the second end portion from the state illustrated in FIG. 27(*a*).
Figure 27B:
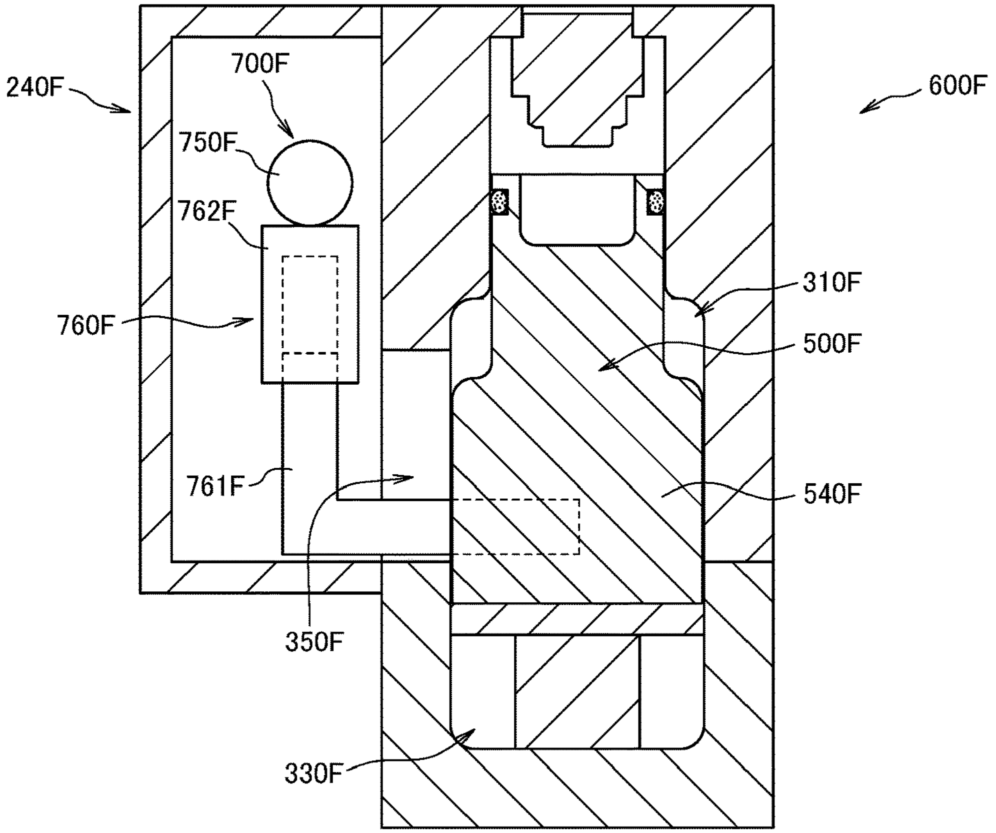

The connection member 760E includes a conductive terminal 761F coupled to the electrode part 540F and the electrode part 550F, and a conductive terminal 762F coupled to the terminal 750F of the fuse 700F, and as illustrated in FIG. 27(*a*), one terminal 761F is in contact with and connected to the other terminal 762F. Since the terminal 761F extends in the direction in which the moving body 500F moves toward the second end portion 330F, as illustrated in FIG. 27(*b*), the terminal 761F is kept in contact with and connected to the terminal 762F while moving toward the second end portion 330F together with the moving body 500F until the electric circuit cut-off device 600F is operated and the moving body 500F is moved and stopped. Therefore, while the moving body 500F is moving, the state in which the fuse 700F and the pair of electrode parts (540F, 550F) are connected is maintained, and the current in the electric circuit is stably supplied from the pair of electrode parts (540F, 550F) to the fuse 700F.

In the connection member 760F, the terminal 761F is inserted into the terminal 762F in a form in which one terminal 761F is a male terminal and the other terminal 762F is a female terminal, and thus the connectivity between the terminal 761F and the terminal 762F can be maintained satisfactorily while the moving body 500F moves. Note that the terminal 761F and the terminal 762F are not limited to the forms illustrated in FIGS. 26 and 27, and may have any shape as long as at least one of the terminal 761F and the terminal 762F extends in the direction in which the moving body 500F moves toward the second end portion 330F, and the state in which the terminal 761F and the terminal 762F are connected to each other can be maintained while the moving body 500F moves.

Eighth Embodiment

Figure 28:
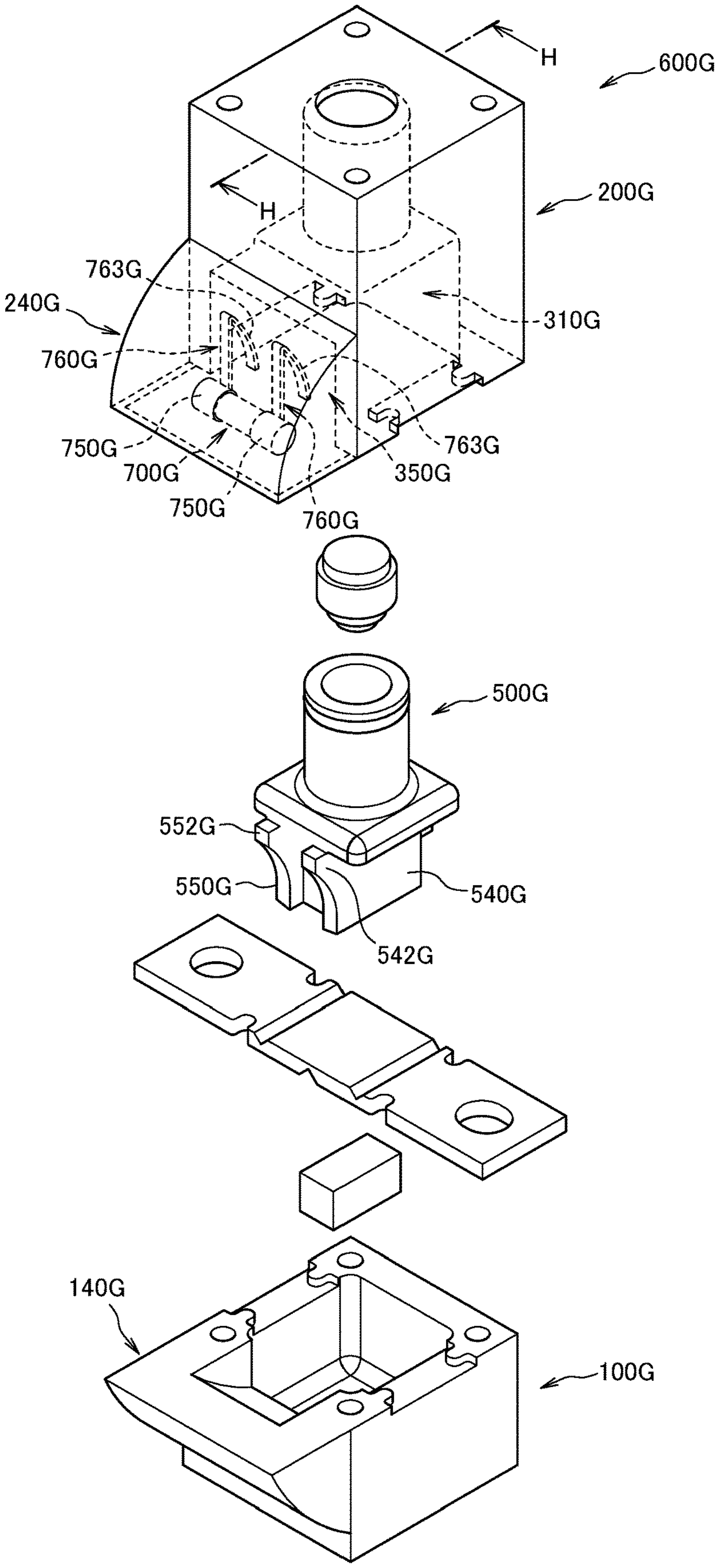
FIG. 28 is an exploded perspective view of an electric circuit cut-off device according to an eighth embodiment of the invention of the present application.

Next, an electric circuit cut-off device 600G of the invention of the present application according to an eighth embodiment will be described with reference to FIGS. 28 and 29. FIG. 28 is an exploded perspective view of the electric circuit cut-off device 600G according to the eighth embodiment, FIG. 29(*a*) is a cross-sectional view taken along line H-H illustrated in FIG. 28, and FIG. 29(*b*) is a cross-sectional view taken along line H-H in a state where the moving body 500G has moved toward the second end portion 330G from the state illustrated in FIG. 29(*a*). In addition, the configuration of the electric circuit cut-off device 600G according to the eighth embodiment is basically the same as the configuration of the electric circuit cut-off device 600 according to the first embodiment except for the configuration of the housing 300G, the configuration of the connection member 760G, and the configuration of the electrode part 540G and the electrode part 550G, and thus the description of the same configuration will be omitted.

As illustrated in FIG. 28, the lower housing 100G of the housing 300G includes an accommodating portion 140G for accommodating the fuse 700G. The upper housing 200G of the housing 300G also includes an accommodating portion 240G for accommodating the fuse 700G. As illustrated in FIGS. 28 and 29, the fuse 700G is accommodated in a part of the housing 300G by the accommodating portion 140G and the accommodating portion 240G. In addition, an opening 350G communicating with the accommodating portion 310G is provided in a part of the housing 300G, so that the connection member 760G connected to the fuse 700G can come into contact with the electrode part 540G and the electrode part 550G of the moving body 500G through the opening 350G. The electrode part 540G is provided with a convex portion 542G protruding toward the connection member 760G, and the electrode part 550G is provided with a convex portion 552G protruding toward the connection member 760G.

Figure 29A:
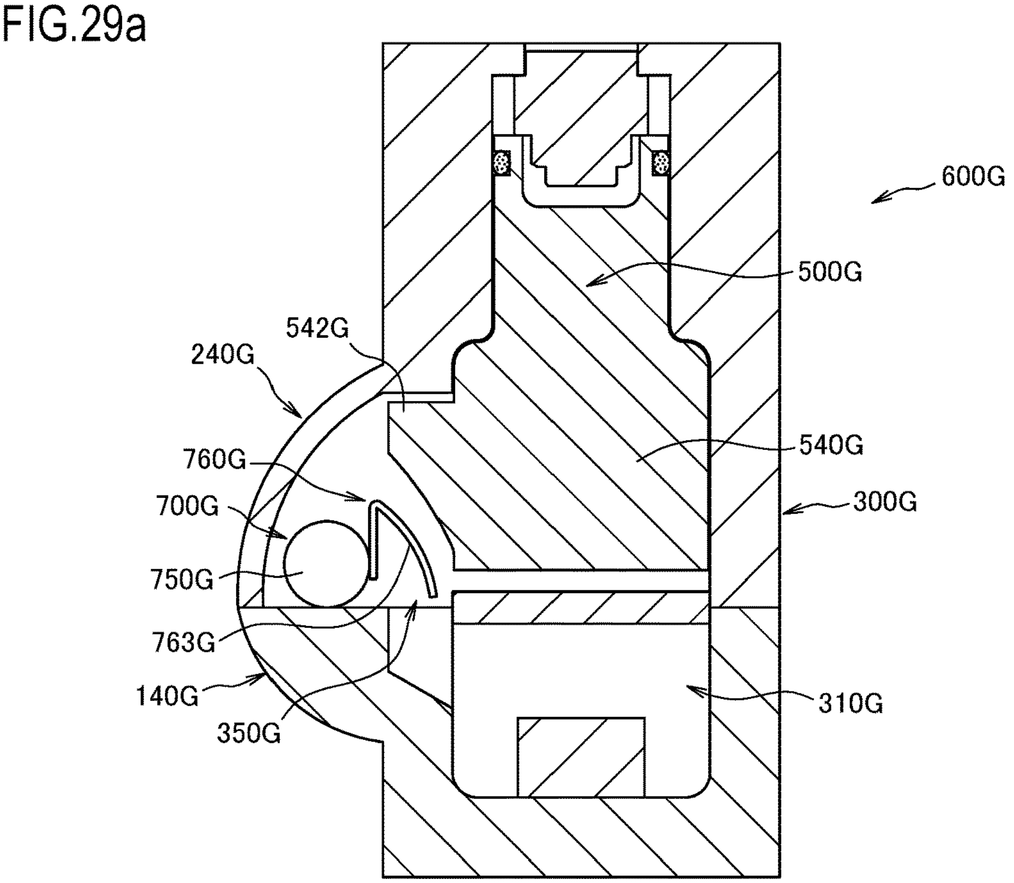
FIG. 29(*a*) is a cross-sectional view taken along line H-H illustrated in FIG. 28, and FIG. 29(*b*) is a cross-sectional view taken along line H-H in a state where the moving body has moved toward the second end portion from the state illustrated in FIG. 29(*a*).
Figure 29B:
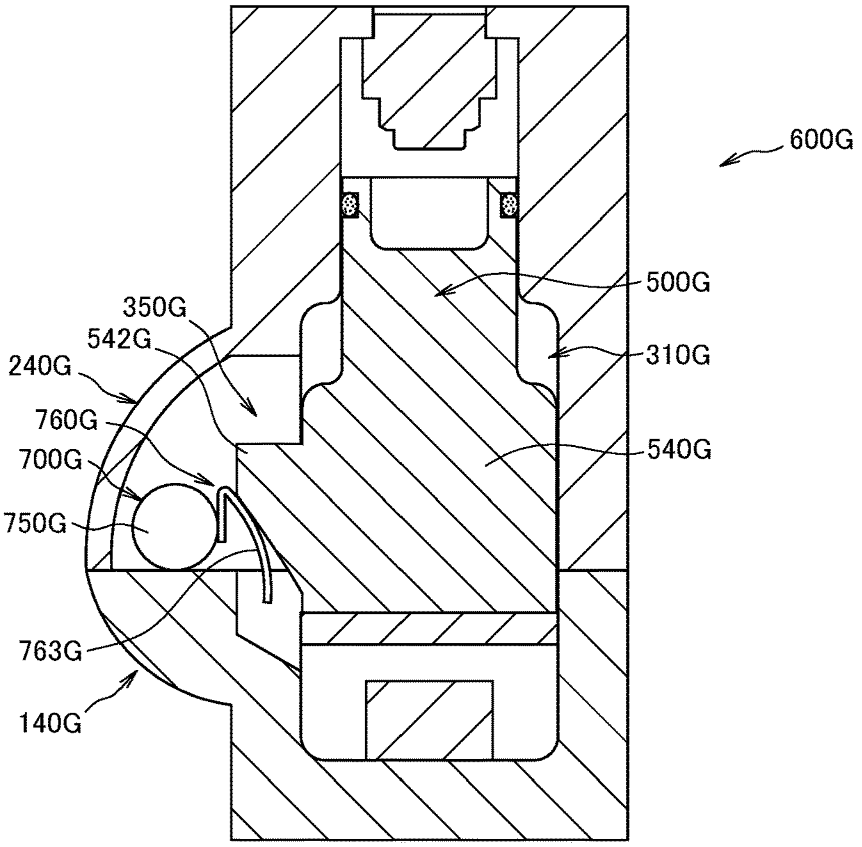

The connection member 760G includes a conductive plate-shaped spring portion 763G coupled to the terminal 750G of the fuse 700G, and as illustrated in FIG. 29(*a*), the spring portion 763G of the connection member 760G is disposed so as to face the convex portion 542G of the electrode part 540G. Note that before the moving body 500G moves, the spring portion 763G of the connection member 760G is not in contact with the electrode part 540G, but the present invention is not limited thereto, and the spring portion 763G of the connection member 760G may be in contact with the electrode part 540G.

Then, as illustrated in FIG. 29(*b*), when the electric circuit cut-off device 600 G is operated to move the moving body 500G, the convex portion 542G of the electrode part 540G and the spring portion 763G of the connection member 760G abut on each other, and the spring portion 763G is pushed and elastically deformed. Then, a biasing force acts on the elastically deformed spring portion 763G toward the electrode part 540G to return to the original state, and thus the spring portion 763G of the connection member 760G strongly abuts on the electrode part 540G, and the state in which the spring portion 763G of the connection member 760G and the electrode part 540G abut on and are connected to each other is firmly maintained. The spring portion 763G of the other connection member 760G corresponding to the electrode part 550G similarly functions. Therefore, while the moving body 500G is moving, the state in which the fuse 700G and the pair of electrode parts (540G, 550G) are connected is maintained, and the current in the electric circuit is stably supplied from the pair of electrode parts (540G, 550G) to the fuse 700G.

As the spring portion 763G of the connection member 760G abuts on the convex portion 542G of the electrode portion 540G, the biasing force toward the electrode part 540G acts on the spring portion 763G of the connection member 760G, but the present invention is not limited to thereto, and the connection member 760G may have any shape as long as the biasing force acts on the electrode part, and the state in which the connection member 760G and the electrode part abut on and are connected to each other can be firmly maintained while the moving body 500G is moving.

Note that the electric circuit cut-off device of the invention of the present application is not limited to the example described above, and various modifications and combinations are possible within the scope of the claims and the scope of the embodiments, and these modifications and combinations are also included in the scope of rights.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The invention claimed is:

1. An electric circuit cut-off device comprising:

a housing;

a to-be-cut part that is disposed in the housing and constitutes a part of an electric circuit;

a power source disposed on a first end portion side of the housing; and a moving body that moves in the housing between the first end portion and a second end portion on an opposite side of the first end portion; wherein a fuse including a fusing portion and an arc-extinguishing material, and at least one electrode part connected to terminals on both sides of the fuse are provided;

the moving body is configured such that a part of the moving body cuts a cut piece located between base pieces on both sides of the to-be-cut part while moving from the first end portion toward the second end portion by the power source;

when the moving body moves toward the second end portion, a part of the to-be-cut part and the electrode part come into contact with each other in a state where base pieces on both sides of the to-be-cut part are energized via the cut piece, and the to-be-cut part and the fuse are connected to each other; and thereafter, accompanying a movement of the moving body, a state in which the base pieces on both sides of the to-be-cut part are energized via the cut pieces is cut off.

2. The electric circuit cut-off device according to claim 1, wherein the electrode part is provided in the moving body;

the state in which the base pieces on both sides of the to-be-cut part are energized via the cut piece is the state in which the base pieces and the cut piece are physically coupled and energized; and the energized state is cut off when a part of the moving body cuts the cut piece.

3. The electric circuit cut-off device according to claim 2, wherein the part of the moving body that cuts the to-be-cut part is the electrode part.

4. The electric circuit cut-off device according to claim 3, wherein the fuse is provided in the housing.

5. The electric circuit cut-off device according to claim 2, wherein the fuse is provided in the housing.

6. The electric circuit cut-off device according to claim 1, wherein the electrode part is provided in the moving body;

the state in which the base pieces on both sides of the to-be-cut part are energized via the cut piece is the state in which the base pieces and the cut piece physically cut and separated from the base piece are energized by arc discharge; and the energized state is cut off by an insulator being interposed between the base piece and the cut piece with the movement of the moving body.

7. The electric circuit cut-off device according to claim 6, wherein the fuse is provided in the housing.

8. The electric circuit cut-off device according to claim 1, wherein the fuse is provided in the housing.

9. The electric circuit cut-off device according to claim 1, wherein the electrode part and the fuse are provided in the housing.

10. The electric circuit cut-off device according to claim 9, wherein the state in which the base pieces on both sides of the to-be-cut part are energized via the cut piece is the state in which the base pieces and the cut piece are physically coupled and energized;

in the energized state, the part of the moving body deforms the part of the to-be-cut part toward the electrode part, so that the electrode part and the part of the to-be-cut part are brought into contact with each other, and the to-be-cut part and the fuse are connected to each other; and the energized state is cut off when the part of the moving body cuts the cut piece.

11. The electric circuit cut-off device according to claim 6, wherein the state in which the base pieces on both sides of the to-be-cut part are energized via the cut piece is the state in which the base pieces and the cut piece physically cut and separated from the base pieces are energized by a conductor provided in the moving body; and in the energized state, the base pieces of the to-be-cut part and the electrode part are connected via the conductor of the moving body, and the to-be-cut part and the fuse are connected.

* * * * *